US011228271B2

(12) United States Patent
Hara et al.

(10) Patent No.: US 11,228,271 B2
(45) Date of Patent: Jan. 18, 2022

(54) CONTROL DEVICE FOR THREE-PHASE SYNCHRONOUS MOTOR AND ELECTRIC POWER STEERING DEVICE USING THE SAME

(71) Applicant: Hitachi Automotive Systems, Ltd., Hitachinaka (JP)

(72) Inventors: Takafumi Hara, Tokyo (JP); Shigehisa Aoyagi, Tokyo (JP); Toshiyuki Ajima, Tokyo (JP); Hiroyuki Ota, Hitachinaka (JP); Yoshitaka Sugiyama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/634,273

(22) PCT Filed: Jul. 13, 2018

(86) PCT No.: PCT/JP2018/026452
§ 371 (c)(1),
(2) Date: Jan. 27, 2020

(87) PCT Pub. No.: WO2019/031157
PCT Pub. Date: Feb. 14, 2019

(65) Prior Publication Data
US 2021/0091700 A1    Mar. 25, 2021

(30) Foreign Application Priority Data
Aug. 10, 2017   (JP) .............................. JP2017-155143

(51) Int. Cl.
*H02P 27/08* (2006.01)
*H02P 21/18* (2016.01)
(Continued)

(52) U.S. Cl.
CPC ............ *H02P 27/08* (2013.01); *B62D 5/0463* (2013.01); *H02K 21/14* (2013.01); *H02P 6/182* (2013.01);
(Continued)

(58) Field of Classification Search
CPC ........ H02P 27/06; H02P 25/18; H02M 7/493; H02M 3/44; B60L 58/20
See application file for complete search history.

(56) References Cited

U.S. PATENT DOCUMENTS

2007/0120520 A1   5/2007   Miyazaki et al.
2009/0200971 A1   8/2009   Iwaji et al.
(Continued)

FOREIGN PATENT DOCUMENTS

JP   7-245981 A    9/1995
JP   2001-276485 A  10/2001
(Continued)

OTHER PUBLICATIONS

International Search Report (PCT/ISA/210) issued in PCT Application No. PCT/JP2018/026452 dated Oct. 30, 2018 with English translation (four pages).
(Continued)

*Primary Examiner* — Said Bouziane
(74) *Attorney, Agent, or Firm* — Crowell & Moring LLP

(57) ABSTRACT

Provides are a control device for a three-phase synchronous motor in which a position detection accuracy of a rotor can be improved when one three-phase synchronous motor is driven by a plurality of inverters, and an electric power steering device using the same. A control device for a three-phase synchronous motor includes: a three-phase synchronous motor including a first three-phase winding and a second three-phase winding; a first inverter connected to the first three-phase winding; a second inverter connected to the (Continued)

second three-phase winding; a first control device that controls the first inverter on the basis of a rotor position of the three-phase synchronous motor; and a second control device that controls the second inverter on the basis of the rotor position of the three-phase synchronous motor. The first control device estimates the rotor position on a basis of a neutral point potential of the first three-phase winding and a neutral point potential of the second three-phase winding.

21 Claims, 17 Drawing Sheets

(51) Int. Cl.
    *H02P 21/32*     (2016.01)
    *B62D 5/04*     (2006.01)
    *H02K 21/14*     (2006.01)
    *H02P 6/182*     (2016.01)
    *H02P 6/18*     (2016.01)
    *H02P 25/22*     (2006.01)

(52) U.S. Cl.
    CPC .............. *H02P 6/187* (2013.01); *H02P 21/18* (2016.02); *H02P 21/32* (2016.02); *H02P 25/22* (2013.01)

(56) References Cited

U.S. PATENT DOCUMENTS

| | | |
|---|---|---|
| 2010/0066284 A1 | 3/2010 | Iwaji et al. |
| 2011/0089876 A1 | 4/2011 | Patel et al. |
| 2014/0077738 A1* | 3/2014 | Iwaji ........................ H02P 21/24 318/400.36 |
| 2014/0207335 A1* | 7/2014 | Mikamo ................ B62D 5/046 701/41 |
| 2015/0155805 A1* | 6/2015 | Iwaji ........................ H02P 6/187 318/400.33 |
| 2017/0117834 A1* | 4/2017 | Fujii ........................ H02P 27/06 |
| 2019/0085809 A1* | 3/2019 | Arai ........................ F02N 11/08 |

FOREIGN PATENT DOCUMENTS

| | | |
|---|---|---|
| JP | 2007-151366 A | 6/2007 |
| JP | 2009-189176 A | 8/2009 |
| JP | 2010-74898 A | 4/2010 |
| JP | 2014-135830 A | 7/2014 |
| JP | 2014-204574 A | 10/2014 |
| JP | 2017-79580 A | 4/2017 |
| WO | WO 2012/157039 A1 | 11/2012 |

OTHER PUBLICATIONS

Japanese-language Written Opinion (PCT/ISA/237) issued in PCT Application No. PCT/JP2018/026452 dated Oct. 30, 2018 (five pages).
Korean Office Action issued in Korean Application No. 10-2020-7003011 dated Jun. 15, 2021 with English translation (23 pages).

* cited by examiner

EXAMPLE OF PERMANENT MAGNET SYNCHRONOUS MOTOR HAVING PLURALITY OF SYSTEMS

CONNECTION BETWEEN WINDINGS AND INVERTERS

CONTROL DEVICE FOR THREE-PHASE SYNCHRONOUS MOTOR AND ELECTRIC POWER STEERING DEVICE USING THE SAME

TECHNICAL FIELD

The present invention relates to a control device for a three-phase synchronous motor that controls a three-phase synchronous motor on the basis of a position of a rotor and an electric power steering device using the same.

BACKGROUND ART

Small and highly efficient three-phase synchronous motors (permanent magnet synchronous motors) are widely used in various fields such as industry, home appliances, and automobiles. In particular, in the field of automobile equipment such as an electric power steering device, a permanent magnet synchronous motor excellent in miniaturization and high efficiency is frequently used.

In a permanent magnet synchronous motor, in general, a rotation position of a rotor provided with a magnet is detected by a magnetic detection element such as a Hall IC, and on the basis of the detection result, an armature coil on the stator side is sequentially excited to rotate the rotor. In addition, by using a resolver, an encoder, a GMR sensor (GMR: Giant Magneto Resistivity effect), or the like which is a precise rotation position detector, it is possible to drive with sinusoidal current and reduce vibration and noise of torque ripple or the like. In recent years, rotation position sensorless control that controls the rotational speed and torque of the motor without providing this rotation position sensor has become widespread.

By putting the rotation position sensorless control into practical use, it is possible to reduce the cost (the cost of the sensor itself, the cost of the sensor wiring, and the like) of the position sensor and the size of the device. Further, since the sensor is not required, there is an advantage that the motor can be controlled in a poor environment for the sensor.

Currently, a method of directly detecting the induced voltage (speed electromotive voltage) generated by the rotation of the rotor provided with a magnet and driving the permanent magnet synchronous motor as rotor position information, a position estimation method of estimating and calculating the rotor position from a mathematical model of the target motor, or the like is adopted as a rotation position sensorless control of the permanent magnet synchronous motor.

These rotation position sensorless controls also have many problems. A problem often described generally is a position detection method when the rotational speed of the motor is low. Most rotation position sensorless control currently in practical use is based on an induced voltage (speed electromotive voltage) generated by the rotation of the permanent magnet synchronous motor. Therefore, in a stop and low speed range where the induced voltage is small, the sensitivity is lowered, and the position information may be buried in noise. As a solution to this problem, techniques described in PTLs 1 to 4 are known.

In the technique described in PTL 1, a radio-frequency current is applied to a permanent magnet synchronous motor, and a rotor position is detected from a current harmonic generated at that time and a mathematical model of the permanent magnet synchronous motor. In this technique, position detection is possible by using the current harmonic generated by the saliency of the rotor of the permanent magnet synchronous motor.

The technique described in PTL 2 is based on a 120-degree energization method that selects and energizes two phases among the three-phase stator windings of the permanent magnet synchronous motor, and the position of the rotor is detected on the basis of an electromotive voltage (the electromotive force due to the inductance imbalance rather than the electromotive force associated with the speed) generated in a non-energized phase. In this technique, since an electromotive voltage generated according to a position is used, the position information can be acquired even in a complete stop state.

In the techniques described in PTLs 3 and 4, the "neutral point potential" that is the potential of the connection point of the three-phase stator winding is detected to obtain the position information. At that time, by detecting the neutral point potential in synchronization with the PWM (pulse width modulation) wave of the inverter, as in the technique of PTL 2, the electromotive voltage due to inductance imbalance can be detected, and as a result, the position information of the rotor can be obtained. Furthermore, with the technique of PTL 3, it is possible to make the drive waveform an ideal sinusoidal current.

Among the techniques of PTLs 1 to 4, the techniques of PTLs 3 and 4 are useful as a position detection unit during the low rotational speed of the motor which is one of the problems of the rotation position sensorless control.

Furthermore, if the combination of a permanent magnet synchronous motor winding and an inverter connected in a one-to-one manner is one system, and the number of systems made of combinations of windings and inverters is two or more for one permanent magnet synchronous motor, although one system fails, another system can continue to operate. However, even in a drive system of a multi-system permanent magnet synchronous motor, it is necessary to obtain the position information of the rotor of the permanent magnet synchronous motor for each system.

CITATION LIST

Patent Literature

PTL 1: JP 7-245981 A
PTL 2: JP 2009-189176 A
PTL 3: JP 2010-74898 A
PTL 4: WO 2012/157039 A

SUMMARY OF INVENTION

Technical Problem

In the technique of PTL 1, saliency is required for the rotor structure of the permanent magnet synchronous motor. If there is no saliency or less, the position detection sensitivity is lowered, and position estimation becomes difficult. Further, in order to detect with high sensitivity, it is necessary to increase the radio-frequency component to be injected or lower the frequency. As a result, rotation pulsation or vibration and noise increases, and harmonic loss of the permanent magnet synchronous motor increases.

In the technique of PTL 2, since an electromotive voltage generated in a non-energized phase of a three-phase winding is observed, the permanent magnet synchronous motor can be driven from a stopped state, but the drive current waveform is 120-degree energized (rectangular wave). Originally, in a permanent magnet synchronous motor, a method of driving with a sinusoidal current is more advantageous for suppressing rotational unevenness and harmonic loss. However, the technique of PTL 2 is difficult to drive with a sine wave.

In the techniques of PTLs 3 and 4, the "neutral point potential" that is the potential of the connection point of the three-phase stator winding is detected to obtain position information. By detecting the neutral point potential in synchronization with the pulse voltage applied from the inverter to the motor, a potential change depending on the rotor position can be obtained. The position information can also be obtained by the PWM (pulse width modulation) obtained by normal sinusoidal modulation as the voltage applied to the motor. However, the technique of PTL 3 has the following problems.

FIG. 1 illustrates a PWM waveform and a neutral point potential waveform according to the techniques of PTLs 3 and 4. PWM pulse waveforms PVu, PVv, and PVw are generated by comparing the three-phase voltage commands Vu*, Vv*, and Vw* and a triangular wave carrier. The three-phase voltage commands Vu*, Vv*, and Vw* have a sinusoidal waveform, but the commands can be regarded as a sufficiently low frequency compared to the triangular wave carrier during low-speed driving. Thus, if a certain moment is caught, the commands can be regarded as direct current as in FIG. 1.

The PWM pulse waves PVu, PVv, and PVw are repeatedly turned on and off at different timings. The voltage vectors in the drawings are named as V(0,0,1) or the like, but subscripts (0,0,1) thereof indicate the switch states of the U, V, and W phases, respectively. That is, V(0, 0, 1) indicates PVu=0 for the U phase, PVv=0 for the V phase, and PVw=1 for the W phase. Here, V(0,0,0) and V(1,1,1) are zero vectors in which the voltage applied to the motor is zero.

As shown in these waveforms, a normal PWM wave generates two types of voltage vectors V(0,0,1) and V(1,0,1) between a first zero vector V(0,0,0) and a second zero vector V(1,1,1). That is, the voltage vector transition pattern "V(0,0,0)→V(0,0,1)→V(1,0,1)→V(1,1,1)→V(1,0,1)→V(0,0,1)→V(0,0,0)" is repeated as one cycle. The voltage vectors used between the zero vectors are the same during the period in which the magnitude relationship between the three-phase voltage commands Vu*, Vv*, and Vw* does not change.

When a voltage other than the zero vector is applied, an electromotive voltage corresponding to the rotor position is generated at the neutral point potential. In the technique of PTL 3, the rotor position is estimated by using this.

However, when rotation position sensorless control using neutral point potential at zero speed or extremely low speed is applied to a motor control device that drives one permanent magnet synchronous motor with two or more inverters, there is a problem in practical. As an example, a case where one permanent magnet synchronous motor is driven by two inverters will be described.

FIG. 2 illustrates an example of a permanent magnet synchronous motor having a plurality of systems and the connection between windings of a motor and inverters. This motor is an 8-pole 12-slot motor having 8 poles and 12 slots. In a slot of a permanent magnet synchronous motor 4, which are grooves provided in a stator core made of laminated electromagnetic steel plates, U-phase, V-phase, and W-phase windings are wound around the electromagnetic steel plates. In a system 1, an inverter 1 and three-phase windings 41 (U1, U2, V1, V2, W1, W2) are connected, and in a system 2, an inverter 2 and three-phase windings 42 (U3, U4, V3, V4, W3, W4) are connected. The rotation position sensorless control is performed using neutral point potential Vn-m of the system 1 and neutral point potential Vn-s of the system 2.

At this time, the three-phase winding 41 of the system 1 and the three-phase winding 42 of the system 2 are wound around the same electromagnetic steel plate. Thus, it can be considered that the system 1 and the system 2 are magnetically coupled. When the inverter 1 connected to the three-phase winding 41 and the inverter 2 connected to the three-phase winding 42 do not output the same voltage pulse synchronously, due to magnetic interference between the systems, the neutral point potential Vn-m of the system 1 and the neutral point potential Vn-s of the system 2 are fluctuated by the voltage applied by each inverter, and it becomes impossible to detect a value necessary for obtaining position information as the neutral point potential.

FIG. 3 is an example of the measurement result of the neutral point potential Vn-m of the three-phase winding 41 connected to the inverter 1. In the drawings, the neutral point potential Vn-m (black line) of the three-phase winding when the inverter 2 is not applying a voltage and the neutral point potential Vn-m (gray line) of the three-phase winding 41 when the inverter 2 is applying a voltage are illustrated. As illustrated in FIG. 3, when the inverter 2 is applying a voltage, the neutral point potential Vn-m of the three-phase winding 41 fluctuates, and the true neutral point potential is not known.

In this regard, the invention provides a control device for a three-phase synchronous motor in which a position detection accuracy of a rotor can be improved when one three-phase synchronous motor is driven by a plurality of inverters, and an electric power steering device using the same.

Solution to Problem

In order to solve the above problems, a control device for a three-phase synchronous motor according to the invention includes: a three-phase synchronous motor including a first three-phase winding and a second three-phase winding; a first inverter connected to the first three-phase winding; a second inverter connected to the second three-phase winding; a first control device that controls the first inverter on the basis of a rotor position of the three-phase synchronous motor; and a second control device that controls the second inverter on the basis of the rotor position of the three-phase synchronous motor. The first control device estimates the rotor position on the basis of a neutral point potential of the first three-phase winding and a neutral point potential of the second three-phase winding.

In order to solve the above problems, a control device for a three-phase synchronous motor according to the invention includes: a three-phase synchronous motor including a first three-phase winding and a second three-phase winding; a first inverter connected to the first three-phase winding; a second inverter connected to the second three-phase winding; a first control device that controls the first inverter on the basis of a rotor position of the three-phase synchronous motor; and a second control device that controls the second inverter on the basis of the rotor position of the three-phase synchronous motor. The first control device acquires information on a driving state of the second inverter, and estimates the rotor position on the basis of a neutral point potential of the first three-phase winding and the information.

In order to solve the above problems, a control device for a three-phase synchronous motor according to the invention includes: a three-phase synchronous motor including a first three-phase winding and a second three-phase winding; a first inverter connected to the first three-phase winding; a second inverter connected to the second three-phase winding; a first control device that controls the first inverter on the basis of a rotor position of the three-phase synchronous motor; and a second control device that controls the second inverter on the basis of the rotor position of the three-phase synchronous motor. The first control device controls the first inverter on the basis of the rotor position sensed by a plurality of redundantly provided rotation position detectors, and the first control device determines abnormality of the plurality of rotation position detectors on the basis of an estimated rotor position estimated from a neutral point potential of the first three-phase winding and a neutral point potential of the second three-phase winding.

In order to solve the above problems, a control device for a three-phase synchronous motor according to the invention includes: a three-phase synchronous motor including a first three-phase winding and a second three-phase winding; a first inverter connected to the first three-phase winding; a second inverter connected to the second three-phase winding; a first control device that controls the first inverter on the basis of a rotor position of the three-phase synchronous motor; a second control device that controls the second inverter on the basis of the rotor position of the three-phase synchronous motor; a first microcomputer configuring the first control device; and a second microcomputer configuring the second control device. A neutral point of the first three-phase winding and a neutral point of the second three-phase winding are electrically connected to the first microcomputer and the second microcomputer.

Furthermore, in order to solve the above-described problems, an electric power steering device according to the invention includes: a steering wheel; a steering mechanism that steers a tire according to an operation of the steering wheel; a motor control device that generates a motor torque according to a rotation torque of the steering wheel; and a steering assist mechanism that transmits the motor torque to the steering mechanism. The motor control device is any one of the control devices for the three-phase synchronous motor according to the invention.

Advantageous Effects of Invention

According to the invention, when one three-phase synchronous motor is driven by a plurality of inverters, the influence of the other system is suppressed in detecting the rotor position of the own system. Accordingly, the position detection accuracy of the rotor can be improved.

The problems, configurations, and effects other than those described above will be apparent from the following description of the embodiments.

DESCRIPTION OF EMBODIMENTS

Figure 1:
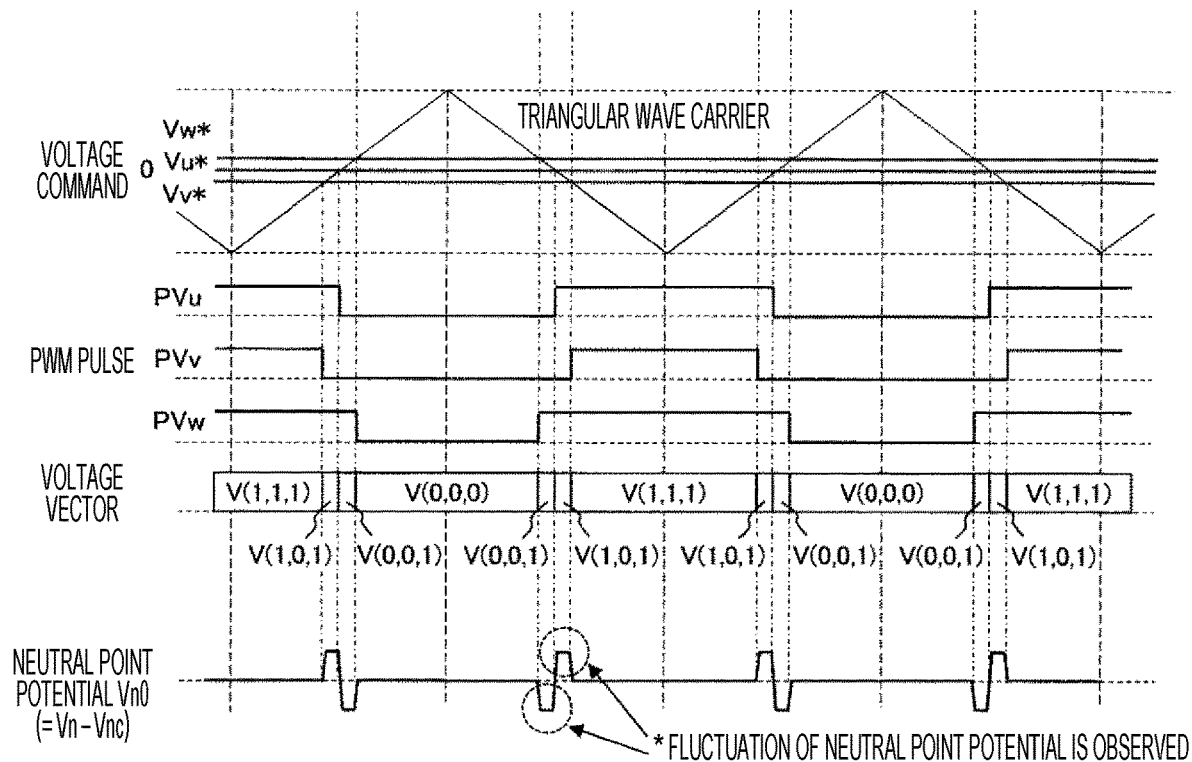
FIG. 1 illustrates PWM waveforms and neutral point potential waveforms according to the techniques of PTLs 3 and 4.

Hereinafter, embodiments of the invention will be described using the drawings. Incidentally, in each drawing, the same reference numerals indicate the same constituent elements or constituent elements having similar functions.

First Embodiment

Figure 4:
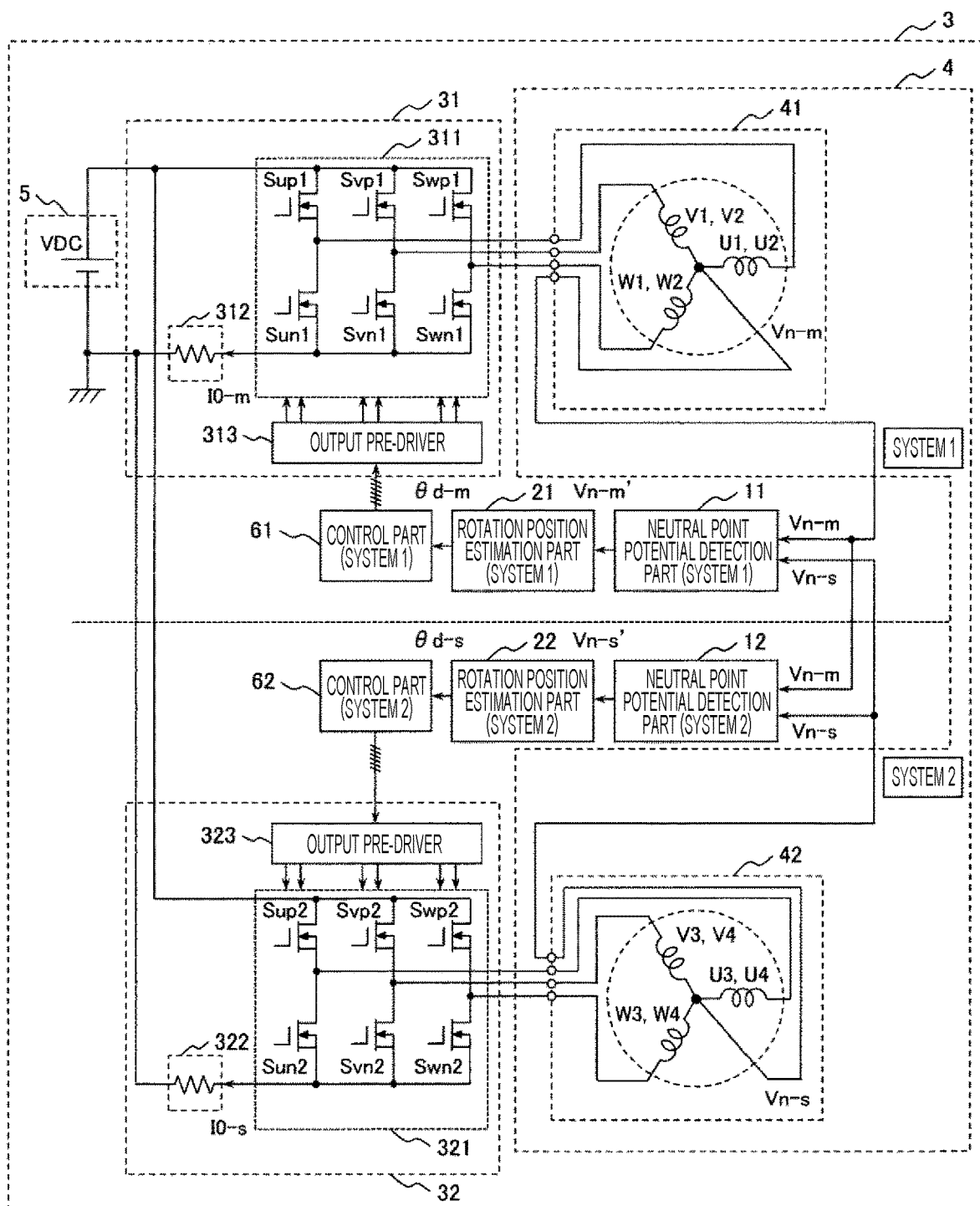
FIG. 4 is a block diagram illustrating a configuration of a motor control device according to a first embodiment.

FIG. 4 is a block diagram illustrating a configuration of a control device for a three-phase synchronous motor (hereinafter referred to as "motor control device"), which is a first embodiment of the invention.

A motor control device 3 drives and controls a permanent magnet synchronous motor 4 as a three-phase synchronous motor. This motor control device 3 includes a DC power supply 5, an inverter 31 of a system 1 including an inverter main circuit 311 and a one-shunt current detector 312, an inverter 32 of a system 2 including an inverter main circuit 321 and a one-shunt current detector 322, and a permanent magnet synchronous motor 4 to be driven.

In this first embodiment, a metal oxide semiconductor field effect transistor (MOSFET) is applied as a semiconductor switching element configuring the inverter main circuits 311 and 321. In addition, the inverters 31 and 32 are voltage types, and generally, a freewheeling diode is connected to the semiconductor switching element in antiparallel. In this first embodiment, a built-in diode of the MOSFET is used as the freewheeling diode, and thus the freewheeling diode is not illustrated in FIG. 4. Incidentally, an insulated gate bipolar transistor (IGBT) or the like may be applied instead of the MOSFET. In addition, the freewheeling diode may be externally attached.

Figure 2:
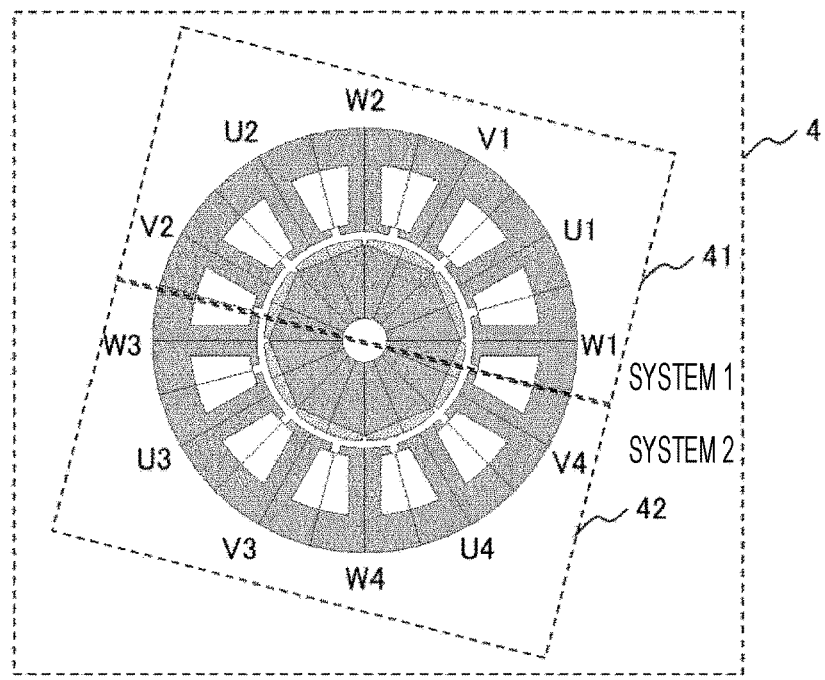
FIG. 2 illustrates an example of a permanent magnet synchronous motor having a plurality of systems and connection between windings of a motor and inverters.
Figure 2:
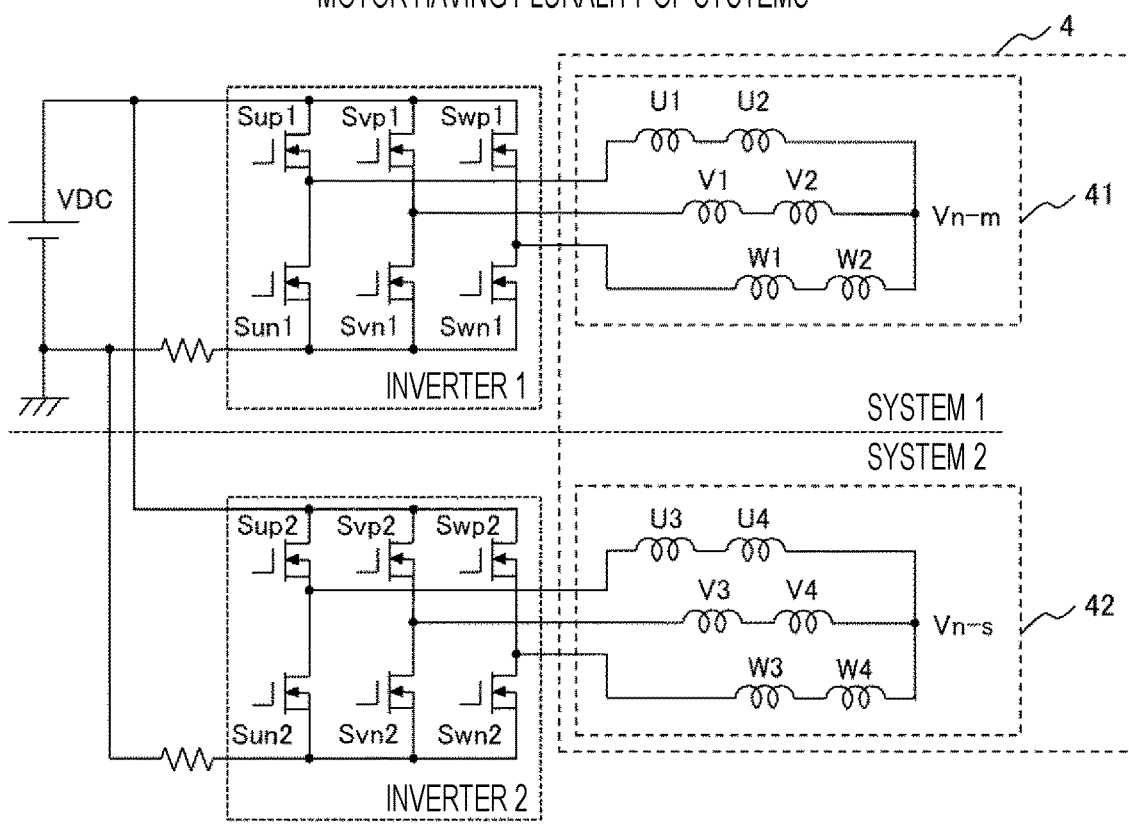

The permanent magnet synchronous motor 4 includes a three-phase winding 41 and a three-phase winding 42 provided on the same stator. The combination of the number of poles and the number of slots is, for example, 8 poles and 12 slots as illustrated in FIG. 2. Incidentally, if the same stator is provided with multiple systems of three-phase windings, and an inverter is connected to each of the three-phase windings, the combination of the number of poles and the number of slots is appropriately set according to the desired motor performance.

The inverter 31 of the system 1 includes an output pre-driver 313 in addition to the inverter main circuit 311 and the one-shunt current detector 312.

The inverter main circuit 311 is a three-phase full-bridge circuit configured by six semiconductor switching elements Sup1 to Swn1.

The one-shunt current detector 312 detects a supply current I0-m (DC bus current) to the inverter main circuit 311 of the system 1.

The output pre-driver 313 is a driver circuit that directly drives the semiconductor switching elements Sup1 to Swn1 of the inverter main circuit 311.

The inverter 32 of the system 2 includes an output pre-driver 323 in addition to the inverter main circuit 321 and the one-shunt current detector 322.

The inverter main circuit 321 is a three-phase full-bridge circuit including six switching elements Sup2 to Swn2.

The one-shunt current detector 322 detects a supply current I0-s (DC bus current) to the inverter main circuit 321 of the system 2.

The output pre-driver 323 is a driver that directly drives the semiconductor switching elements Sup2 to Swn2 of the inverter main circuit 321.

Incidentally, the three-phase current flowing through the three-phase winding 41 is measured by a so-called one-shunt method on the basis of the DC bus current I0-m detected by the one-shunt current detector 312. In addition, similarly, the three-phase current flowing in the three-phase winding 42 is measured on the basis of the DC bus current I0-s detected by the one-shunt current detector 312. Incidentally, since the one-shunt method is a known technique, detailed description is omitted.

The DC power supply 5 supplies DC power to the inverter of the system 1 and the inverter 32 of the system 2. Incidentally, the DC power may be supplied to the inverter 31 and the inverter 32 by separate DC power supplies.

The control part 61 of the system 1 creates a gate command signal to be given to the output pre-driver 313 on the basis of the rotor position θd-m which is estimated and calculated by the rotation position estimation part 21 from a neutral point potential Vn-m' of the system 1 which is detected by a neutral point potential detection part 11 on the basis on the neutral point potential Vn-m of the three-phase winding 41 and the neutral point potential Vn-s of the three-phase winding 42 and from which the fluctuation due to Vn-s is removed.

The control part 62 of the system 2 creates a gate command signal to be given to the output pre-driver 323 on the basis of the rotor position θd-s which is estimated and calculated by the rotation position estimation part 22 from a neutral point potential Vn-s' of the system 2 which is detected by a neutral point potential detection part 12 on the basis on the neutral point potential Vn-s of the three-phase winding 42 and the neutral point potential Vn-m of the three-phase winding 41 and from which the fluctuation due to Vn-m is removed.

Figure 5:
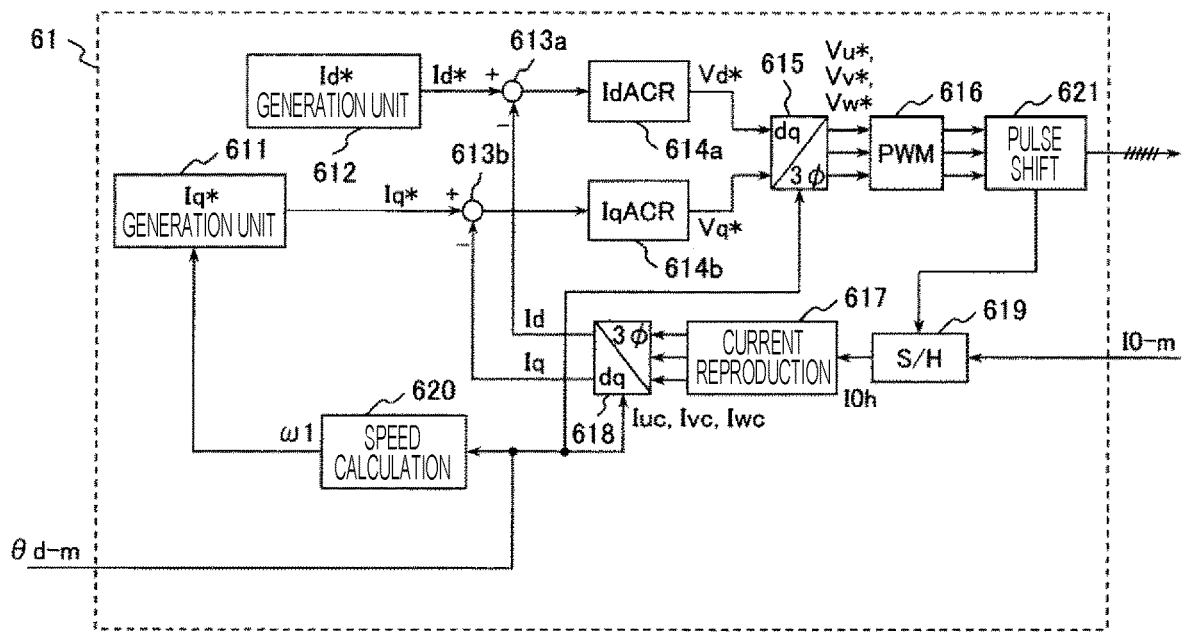
FIG. 5 illustrates a block diagram of a control part of system 1.

FIG. 5 illustrates a block diagram of the control part 61 of the system 1. In the control part 61, so-called vector control is applied. Incidentally, the configuration of the control part 62 of the system 2 is the same as that of the control part 61, and thus the description thereof is omitted.

As illustrated in FIG. 5, the control part 61 of the system 1 includes a q-axis current command generation unit (Iq* generation unit) 611, a d-axis current command generation unit (Id* generation unit) 612, a subtraction unit 613a, and a subtraction unit 613b, a d-axis current control unit (IdACR) 614a, q-axis current control unit (IqACR) 614b, a dq inverse conversion unit 615, a PWM generation unit 616, a current reproduction unit 617, a dq conversion unit 618, a sample/hold unit 619, a speed calculation unit 620, and a pulse shift unit 621. With this configuration, the control part 61 operates such that the permanent magnet synchronous motor 4 generates a torque corresponding to the q-axis current command Iq*.

The Iq* generation unit 611 generates a q-axis current command Iq* corresponding to the motor torque. The Iq* generation unit 611 normally generates the q-axis current command Iq* such that the rotational speed of the permanent magnet synchronous motor 4 becomes a predetermined value while observing an actual speed ω1. The q-axis current command Iq*, which is the output of the Iq* generation unit 611, is output to a subtraction unit 613b.

The Id* generation unit 612 generates a d-axis current command Id* corresponding to the excitation current of the permanent magnet synchronous motor 4. The d-axis current command Id* that is the output of the Id* generation unit 612 is output to a subtraction unit 613a.

The subtraction unit 613a obtains deviation between the d-axis current command Id* output from the Id* generation unit 612 and a d-axis current Id output from the dq conversion unit 618, that is, the d-axis current Id obtained by dq conversion of a three-phase current (Iuc, Ivc, Iwc) flowing through the three-phase winding 41.

The subtraction unit 613b obtains deviation between the q-axis current command Iq* output from the Iq* generation unit 611 and a q-axis current Iq output from the dq conversion unit 618, that is, the q-axis current Iq obtained by dq conversion of the three-phase current (Iuc, Ivc, Iwc) flowing through the three-phase winding 41.

The IdACR 614a calculates a d-axis voltage command Vd* on a dq coordinate axis such that the d-axis current deviation calculated by the subtraction unit 613a becomes zero. Further, the IqACR 614b calculates a q-axis voltage command Vq* on the dq coordinate axis such that the q-axis current deviation calculated by the subtraction unit 613b becomes zero. The d-axis voltage command Vd* that is the output of IdACR 614a and the q-axis voltage command Vq* that is the output of IqACR 614b are output to the dq inverse conversion unit 615.

The dq inverse conversion unit 615 converts the voltage commands Vd* and Vq* of the dq coordinate (magnetic flux axis-magnetic flux axis orthogonal axis) system into the voltage commands Vu*, Vv*, and Vw* on the three-phase AC coordinate. The dq inverse conversion unit 615 calculates the voltage commands Vu*, Vv*, and Vw* of the three-phase AC coordinate system on the basis of the voltage commands Vd* and Vq* and the rotor position ed-m output from the rotation position estimation part 21 (FIG. 4) of the system 1. The dq inverse conversion unit 615 outputs the calculated Vu*, Vv*, and Vw* to the PWM generation unit 616.

The PWM generation unit 616 outputs a pulse width modulation (PWM) signal for controlling the power conversion operation of the inverter main circuit 311 of the system 1. The PWM generation unit 616 compares these three-phase AC voltage commands and a carrier signal (for example, a triangular wave) on the basis of the three-phase AC voltage commands Vu*, Vv*, and Vw* to generate a PWM signal (PVu, PVv, and PVw in FIGS. 9, 10, and 14 to be described later) The PWM signal output from the PWM generation unit 616 is input to the output pre-driver 313 (FIG. 4) and the sample/hold unit (S/H circuit) 619 via the pulse shift unit 621 to be described later.

The current reproduction unit 617 reproduces a three-phase current (Iuc, Ivc, Iwc) flowing through the three-phase winding 41 from the DC bus current I0-m output from the inverter main circuit 311 to the one-shunt current detector 312. The reproduced three-phase current (Iuc, Ivc, Iwc) is output from the current reproduction unit 617 to the dq conversion unit 618.

The dq conversion unit 618 converts the three-phase current (Iuc, Ivc, Iwc) into Id and Iq on the dq coordinate that is the rotation coordinate axis. The converted Id and Iq are used for the calculation of the deviation from the current command in the subtraction unit 613a and 613b, respectively.

The speed calculation unit 620 calculates the rotational speed ω1 of the permanent magnet synchronous motor from the rotor position ed-m that is an estimated value of the rotor position. The calculated rotational speed ω1 is output to the Iq* generation unit 611 and used for current control on an axis (q axis) orthogonal to the magnetic flux axis (d axis).

Incidentally, in this first embodiment, the neutral point potential detection part 11, the rotation position estimation part 21, and the control part 61, that is, the control device part of the system 1 are configured by a single microcomputer. Further, the neutral point potential detection part 12, the rotation position estimation part 22, and the control part 62, that is, the control device part of the system 2 are configured by another single microcomputer. The neutral point of the three-phase winding 41 and the neutral point of the three-phase winding 42 are electrically connected to a control microcomputer in the system 1 and a control microcomputer in the system 2 by wiring or the like, respectively.

Each of the inverter main circuit 311, the output pre-driver 313, the inverter main circuit 321, and the output pre-driver 323 may be configured by an integrated circuit device. Further, each of the inverter 31 and the inverter 32 may be configured by an integrated circuit device. As a result, the motor control device can be greatly reduced in size. In addition, the motor control device can be easily mounted on various electric devices, and the various electric devices can be reduced in size.

Next, the basic operation of this motor drive system will be described.

In this first embodiment, vector control generally known as a control means for linearizing the torque of the synchronous motor is applied.

The principle of the vector control technique is a method of independently controlling the current Iq contributing to the torque and the current Id contributing to the magnetic flux on the rotation coordinate axis (dq coordinate axis) based on the rotor position of the motor. The d-axis current control unit 614a, the q-axis current control unit 614b, the dq inverse conversion unit 615, the dq conversion unit 618, and the like in FIG. 5 are the main parts for realizing this vector control technique.

In the control part 61 of the system 1 in FIG. 5, the current command Iq* corresponding to the torque current is calculated by the Iq* generation unit 611, and a current control is performed such that the current command Iq* matches the actual torque current Iq of the permanent magnet synchronous motor 4.

In the case of a non-salient permanent magnet synchronous motor, the current command Id* is normally given "zero". On the other hand, in a salient-pole permanent magnet synchronous motor or field weakening control, a negative command may be given as the current command Id*.

Incidentally, the three-phase current of the permanent magnet synchronous motor is directly detected by a current sensor such as a current transformer (CT), or a DC bus current is detected to reproduce and calculate the three-phase current inside a controller on the basis of the DC bus current as in this first embodiment. In this first embodiment, a three-phase current is reproduced and calculated from the DC bus current I0-m of the system 1 and the DC bus current I0-s of the system 2. For example, in the control part 61 illustrated in FIG. 5, the S/H unit 619 is operated at a timing according to the PWM signal phase-shifted by the pulse shift unit 621 to sample and hold the current value of the DC bus current I0-m, and the current value of the DC bus current I0-m including information on the three-phase current is acquired. Then, a three-phase current (Iuc, Ivc, Iwc) is reproduced and calculated by the current reproduction unit 617 from the acquired current value. Incidentally, since the concrete means of reproduction and calculation is a well-known technique, detailed description is omitted.

In this first embodiment, the reference rotor position in the rotation coordinate system is estimated by the rotation position estimation part on the basis of the neutral point potential of the three-phase winding. For example, in the system 1, the rotation position estimation part 21 estimates the rotor position ed-m for the three-phase winding 41 on the basis of the neutral point potential Vn-m' which is detected by the neutral point potential detection part 11 and from which the influence of the system 2 is removed. Incidentally, similarly, also in the system 2, the rotor position ed-s is estimated for the three-phase winding 42.

Hereinafter, the means for estimating the rotor position from the neutral point potential in this first embodiment will be described with the system 1 as a representative.

First, the fluctuation of the neutral point potential will be described.

The output potential of each phase of the inverter 31 is set by the on/off state of the upper semiconductor switching elements (Sup1, Svp1, Swp1) or the lower semiconductor switching elements (Sun1, Svn1, Swn1) of the inverter main circuit 311. In each phase of these semiconductor switching elements, if one of the upper side and the lower side is in an on state, the other is in an off state. That is, in each phase, the upper and lower semiconductor switching elements are complementarily turned on/off. Therefore, the output voltage of the inverter 31 has eight switching patterns in total.

Figure 6:
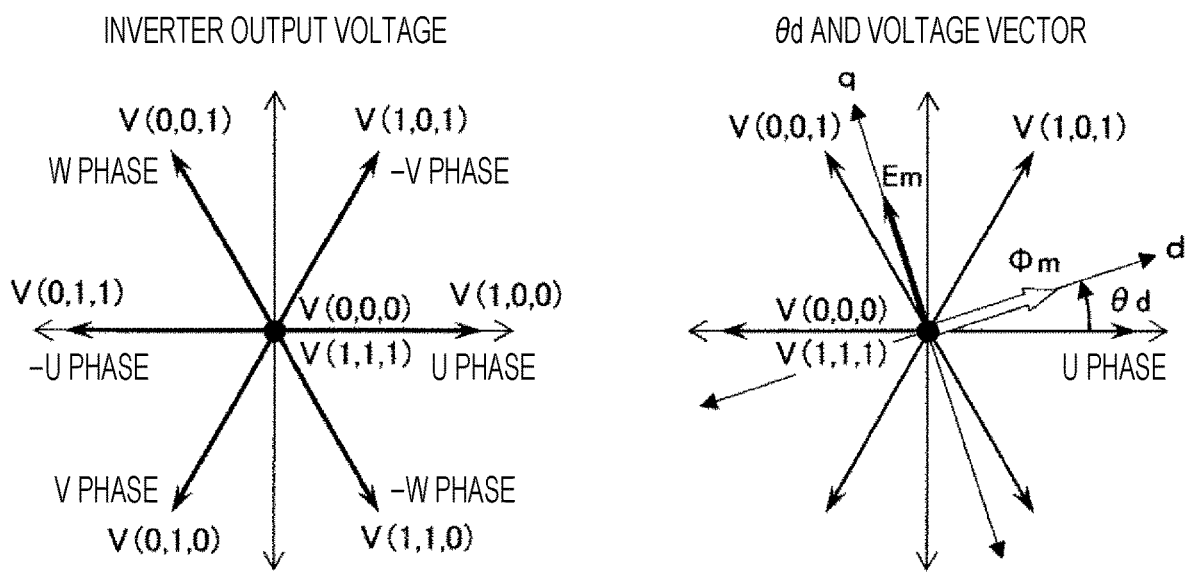
FIG. 6 is a vector diagram illustrating a switching pattern of an inverter output voltage and a vector diagram illustrating a relationship between a rotor position and a voltage vector.

FIG. 6 is a vector diagram (left diagram) illustrating the switching pattern of the inverter output voltage and a vector diagram (right diagram) illustrating the relationship between the rotor position (phase) θd and the voltage vector.

Each vector is named as V(1,0,0) or the like. In this vector notation, the upper semiconductor switching element is turned on by "1", and the lower semiconductor switching element is turned on by "0". The switching states are indicated in the order of "U phase, V phase, W phase" which is the number sequence in parentheses. The inverter output voltage can be expressed using eight voltage vectors including two zero vectors (V(0,0,0), V(1,1,1)). A sinusoidal current is supplied to the permanent magnet synchronous motor 4 by combining these eight voltage vectors.

As illustrated in FIG. 6 (right diagram), the rotor position (phase) θd is defined with the reference of the rotor position of the permanent magnet synchronous motor 4 as the U-phase direction. The dq coordinate axis in the rotation coordinate is rotated counterclockwise with the direction of the magnet magnetic flux Om as the d-axis direction. Incidentally, the q-axis direction is a direction orthogonal to the d-axis direction.

Herein, when it is approximately satisfied θd=0°, the direction of an induced voltage vector Em is the q-axis direction, and thus the induced voltage vector is positioned near the voltage vectors V(1,0,1) and V(0,0,1). In this case, the permanent magnet synchronous motor 4 is driven mainly using the voltage vectors V(1,0,1) and V(0,0,1). Incidentally, voltage vectors V(0,0,0) and V(1,1,1) are also used, but these are zero vectors.

Figure 7:
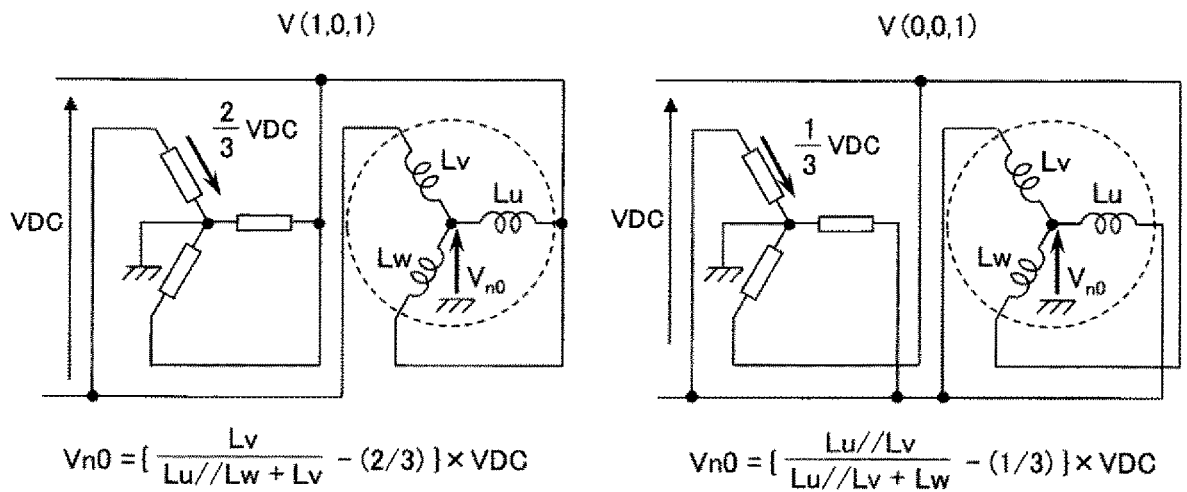
FIG. 7 illustrates a relationship between a permanent magnet synchronous motor and a virtual neutral point circuit when a voltage vector is applied.

FIG. 7 illustrates the relationship between the permanent magnet synchronous motor 4 and the virtual neutral point circuit 34 in a state where a voltage vector is applied. Here, Lu, Lv, and Lw are the inductance of the U-phase winding, the inductance of the V-phase winding, and the inductance of the W-phase winding, respectively. Incidentally, the applied voltage vectors are the above-described voltage vectors V(1,0,1) (left diagram) and V(0,0,1) (right diagram).

The neutral point potential Vn0 illustrated in FIG. 7 can be calculated as follows.

When the voltage vector V(1,0,1) is applied, the neutral point potential is calculated by Equation (1).

$$Vn0=\{Lv/(Lu//Lw+Lv)-(2/3)\}\times VDC \quad (1)$$

When the voltage vector V(0,0,1) is applied, the neutral point potential is calculated by Equation (2).

$$Vn0=\{(Lu//Lv)/(Lu//Lv+Lw)-(1/3)\}\times VDC \quad (2)$$

Here, the notation "//" indicates the total inductance value of the parallel circuit of two inductances, and for example, "Lu//Lw" is expressed by Equation (3).

$$Lu//Lw=(Lu\cdot Lw)/(Lu+Lw) \quad (3)$$

If the magnitudes of the three-phase winding inductances Lu, Lv, and Lw are all equal, the neutral point potential Vn0 is zero according to Equations (1) and (2). However, in practice, there is a considerable difference in the magnitude of inductance due to the influence of the permanent magnet magnetic flux distribution of the rotor. That is, the magnitudes of the inductances Lu, Lv, and Lw vary depending on the position of the rotor, and there are differences in the magnitudes of Lu, Lv, and Lw. For this reason, the magnitude of the neutral point potential Vn0 changes according to the rotor position.

FIG. 1 described above illustrates the aspect of the pulse width modulation using a triangular wave carrier, the voltage vector at that time, and the change aspect of the neutral point potential. Herein, the triangular wave carrier is a reference signal for converting the magnitude of the three-phase voltage commands Vu*, Vv*, Vw* into a pulse width. A PWM pulse is created by comparing the magnitude relationship between the triangular wave carrier and the three-phase voltage command Vu*, Vv* and Vw*. As illustrated in FIG. 1, the rise/fall of the PWM pulse changes at the time when the magnitude relationship between each of the voltage commands Vu*, Vv*, and Vw* and the triangular wave carrier changes. In addition, at the same time, a non-zero neutral point potential Vn0 is detected.

As illustrated in FIG. 1, the neutral point potential Vn0 hardly fluctuates except at the rise/fall time of the PWM pulse. This indicates that the difference in the magnitudes of the three-phase winding inductances Lu, Lv, and Lw generated according to the rotor position is small. In contrast, when the PWM pulse rises/falls, that is, when a voltage vector other than the zero vector (in FIGS. 1, V(1,0,1) and V(0,0,1)) is applied, the change rate of the motor current increases. Thus, a relatively large fluctuation in the neutral point potential Vn0 is detected even if the difference in the magnitude of the inductance is small. Therefore, if the neutral point potential is observed in synchronization with the PWM pulse signals PVu, PVv, and PWw, the fluctuation of the neutral point potential can be detected with high sensitivity.

Next, a means for estimating the rotor position from the detected neutral point potential will be described.

Since the neutral point potential Vn0 changes periodically according to the rotor position (for example, see PTLs 3 and 4 described above), the relation between the rotor position and the neutral point potential Vn0 is measured or simulated in advance to obtain map data, table data, or a function indicating the relation between the rotor position and the neutral point potential Vn0. The rotor position is estimated from the detected neutral point potential using such map data, table data, or function.

The neutral point potentials detected for two types of voltage vectors (V(1,0,1) and V(0,0,1) in FIG. 1) are regarded as the three-phase AC amounts (for two phases). The phase amount is calculated using coordinate conversion (three-phase two-phase conversion), and this phase amount is used as the estimated value of the rotor position. Incidentally, since this means is based on a known technique (see, for example, PTL 4 described above), detailed description is omitted.

The rotation position estimation part 21 (FIG. 4) of the system 1 estimates the rotor position θd-m on the basis of the neutral point potential Vn-m' output from the neutral point potential detection part 11 by the estimation unit as described above. These estimation means are appropriately selected according to the desired position detection accuracy and the performance of the control microcomputer. Incidentally, the same is applied to the rotation position estimation part 22 (FIG. 4) of the system 2.

Hereinafter, the neutral point potential detection part (FIG. 4) according to this first embodiment will be described.

The neutral point potential detection part 11 of the system 1 detects the neutral point potential detection value Vn-m' of the system 1 that is not affected by Vn-s on the basis of the neutral point potential Vn-m sensed at the neutral point of the three-phase winding 41 and the neutral point potential Vn-s sensed at the neutral point of the three-phase winding 42.

The neutral point potential detection part 12 of the system 2 detects the neutral point potential detection value Vn-s' of the system 2 that is not affected by Vn-m on the basis of the neutral point potential Vn-s sensed at the neutral point of the three-phase winding 42 and the neutral point potential Vn-m sensed at the neutral point of the three-phase winding 41.

Figure 3:
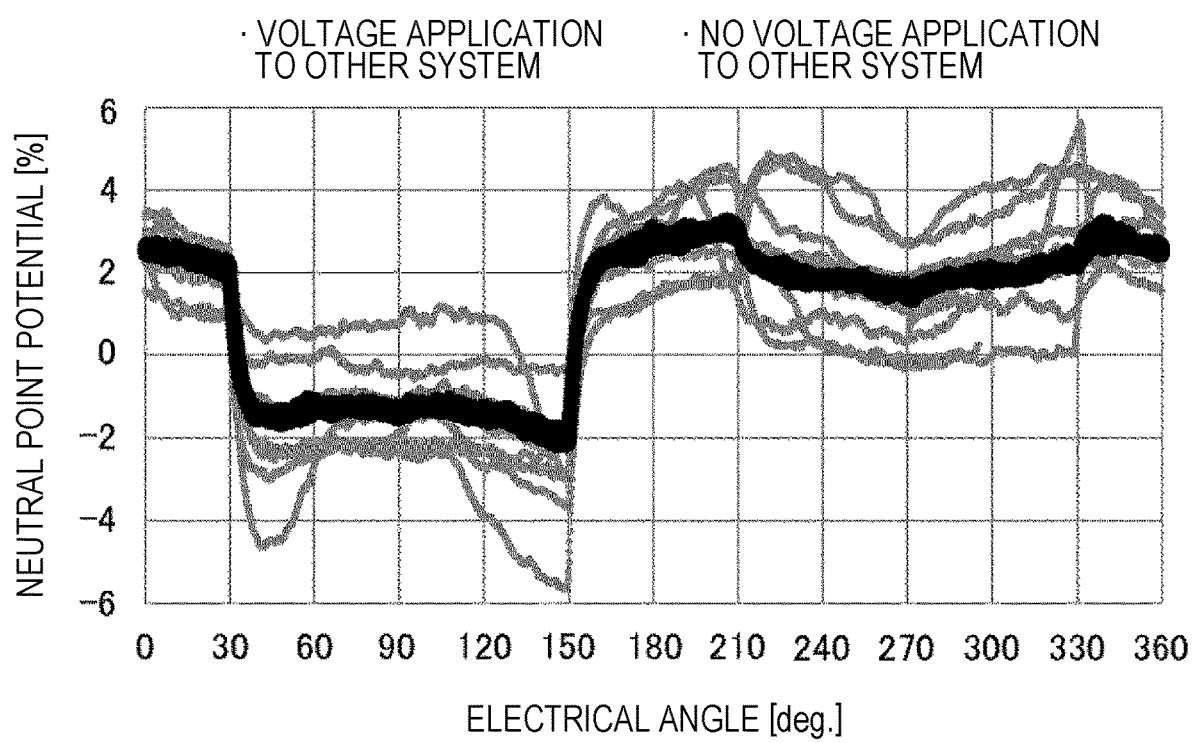
FIG. 3 is an example of a measurement result of a neutral point potential of a three-phase winding connected to an inverter 1.

In this first embodiment, in order to detect a neutral point potential that is not affected by other systems, that is, in order to prevent the detection errors as illustrated in FIG. 3 from occurring due to voltage application in other systems, the neutral point potential (for example, Vn-m) of own system (for example, system 1) and the neutral point potential (for example, Vn-s) of the other system (for example, system 2) are taken in the neutral point potential detection part (for example, 11) of the own system, and the neutral point potential detection value of the own system is acquired at a timing when the voltage is not applied to the other system.

First, the relation between the voltage applied to the permanent magnet synchronous motor and the neutral point potential will be described by using FIGS. 8 to 10.

Figure 8:
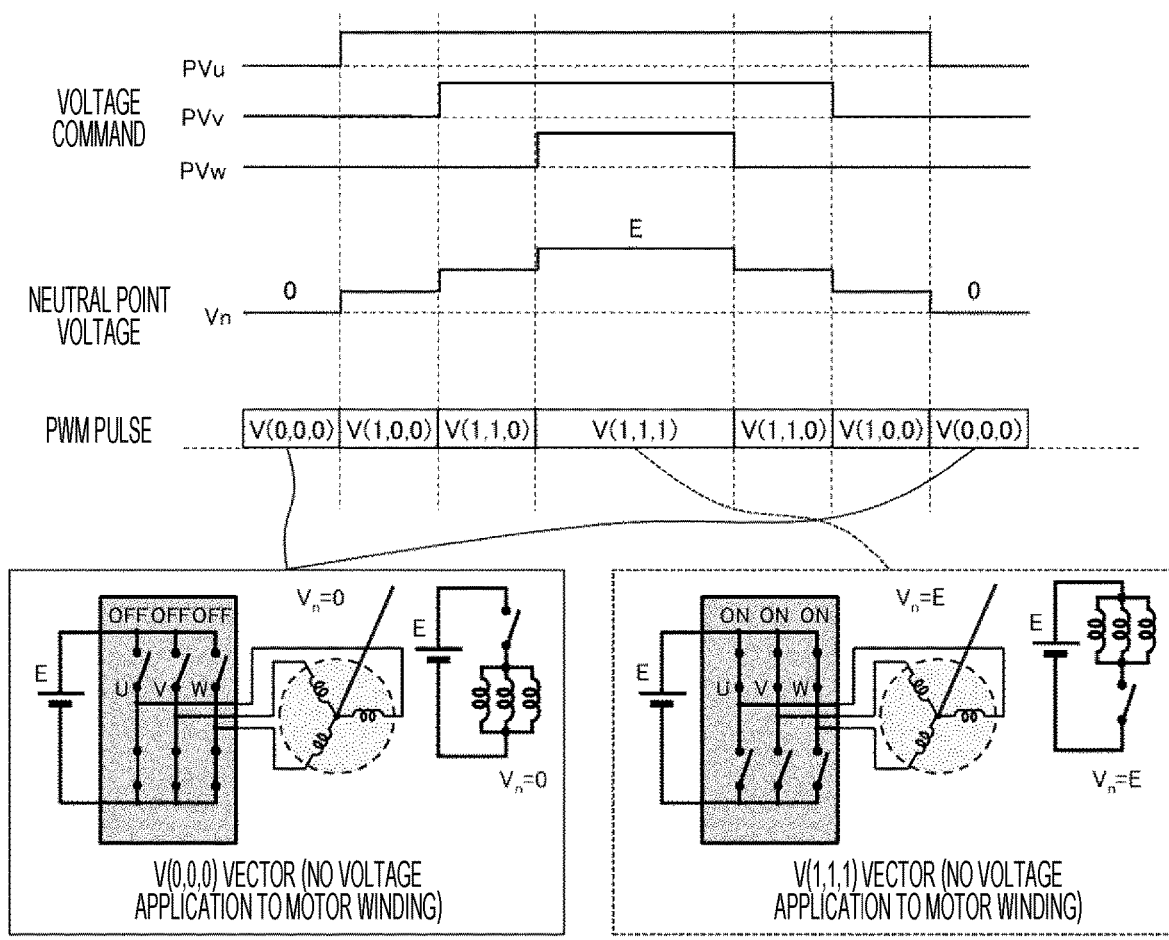
FIG. 8 illustrates an example of a relationship between a voltage command, a neutral point voltage, and a PWM pulse.

FIG. 8 illustrates an example of the relation between the voltage command, the neutral point voltage, and the PWM pulse. Incidentally, in FIG. 8, the semiconductor switching element is indicated by a circuit symbol representing a switch.

As illustrated in FIG. 8, when the voltage vector is V(0,0,0), the upper semiconductor switching elements (Sup1, Svp1, Swp1) of the inverter main circuit 311 are turned off. At this time, the voltage applied to the winding of the permanent magnet synchronous motor 4 becomes zero, and the neutral point potential Vn becomes zero. In addition, when the voltage vector is V(1,1,1), the lower semiconductor switching elements (Sun1, Svn1, Swn1) of the inverter main circuit 311 are turned off. At this time, the voltage applied to the winding of the permanent magnet synchronous motor 4 becomes zero, and the neutral point potential Vn becomes E which is the same as the DC power supply voltage. Therefore, whether or not a voltage is applied to the winding of the permanent magnet synchronous motor 4 is determined on the basis of the sensed neutral point potential of the three-phase winding. If the neutral point potential is either zero or the DC power supply voltage E, it is determined that the voltage is not applied, and if the neutral point potential is not any, it is determined that the voltage is applied.

As described above, the neutral point potential detection parts 11 and 12 of this first embodiment determine whether or not a voltage is applied to the windings of the permanent magnet synchronous motor 4.

Figure 9:
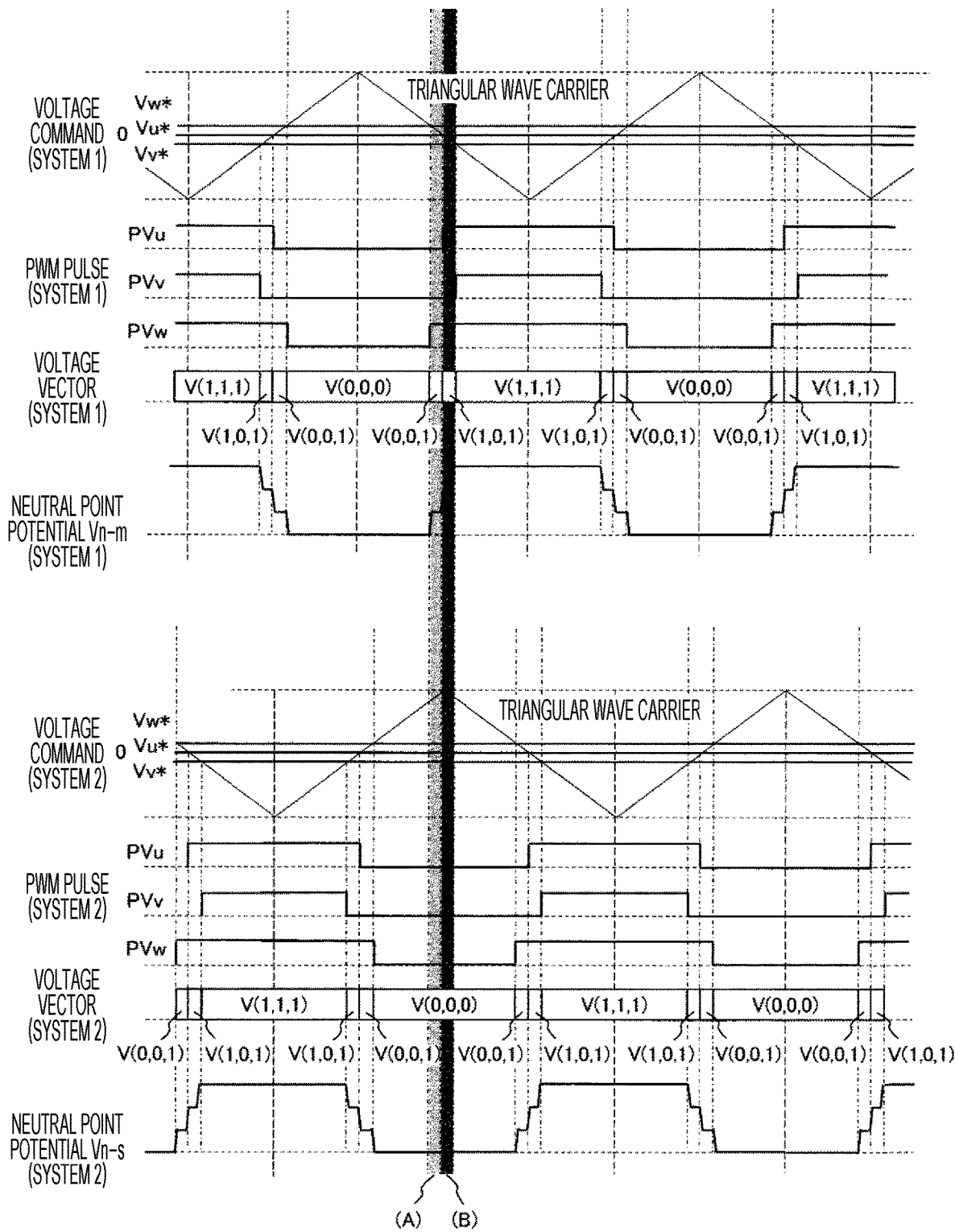
FIG. 9 illustrates an example of a relation among a voltage command, a PWM pulse, a voltage vector, and a neutral point potential in the first embodiment.

FIG. 9 illustrates an example of the relation among the voltage command, the PWM pulse, the voltage vector, and the neutral point potential (Vn-m, Vn-s) in the system 1 and the system 2 in this first embodiment.

As illustrated in FIG. 9, the sections where the applied voltages of the inverter main circuit 311 of the system 1 are V(0,0,1) and V(1,0,1) are set as a section (A) and a section (B), respectively. In both the section (A) and the section (B), the neutral point potential Vn-s of the system 2 is zero. At this time, the voltage vector in the system 2 is the zero vector V(0,0,0), and therefore no voltage is applied to the inverter main circuit 321 in the system 2. For this reason, Vn-m is not affected by system 2.

Incidentally, the neutral point potential Vn-s of the system 2 may be the DC power supply voltage E in the sections (A) and (B). In this case, the voltage vector in the system 2 is the zero vector V(1,1,1), and thus no voltage is applied to the inverter main circuit 321 in the system 2.

Figure 10:
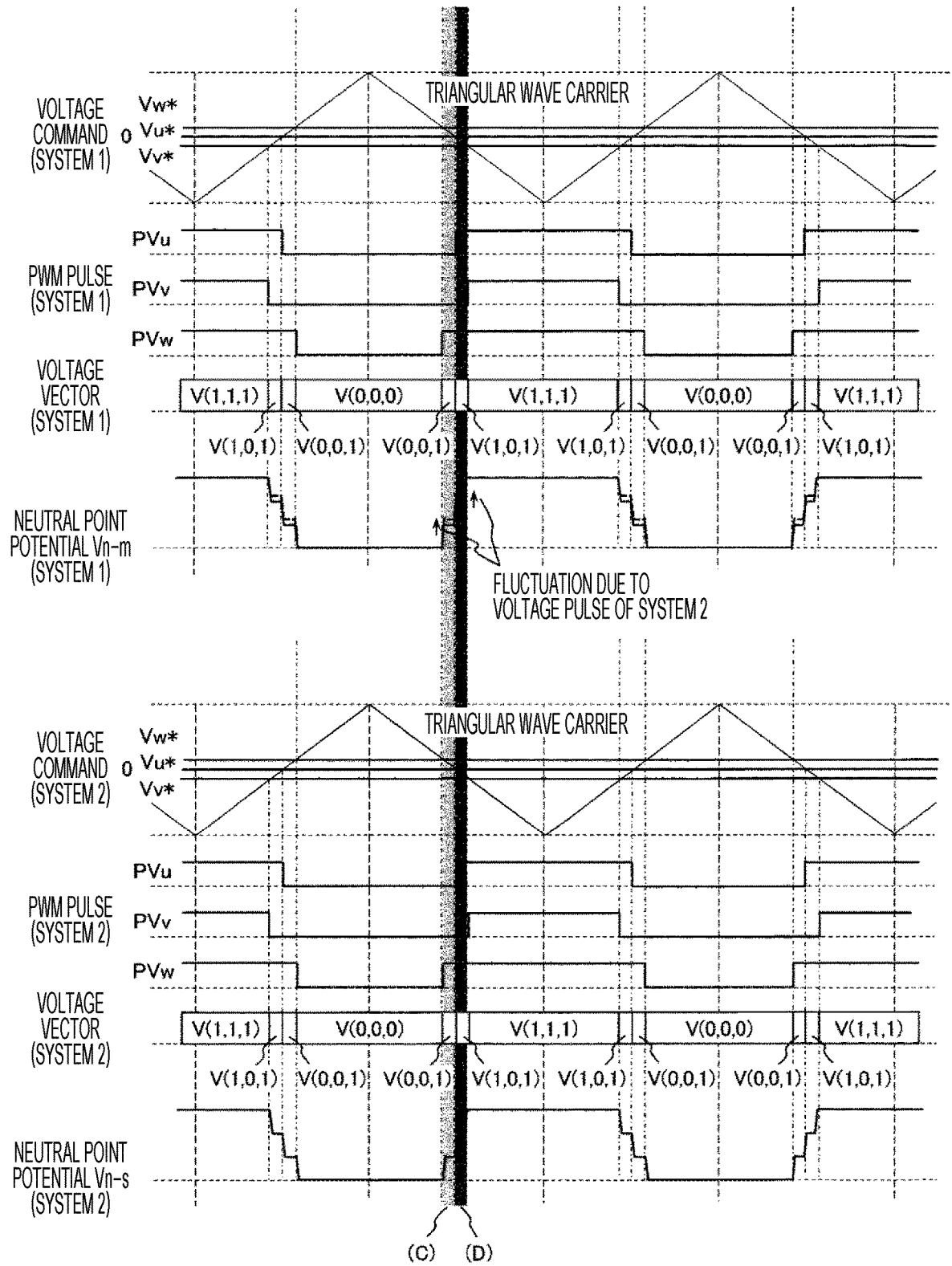
FIG. 10 illustrates another example of the relation among the voltage command, the PWM pulse, the voltage vector, and the neutral point potential in the first embodiment.

FIG. 10 illustrates another example of the relation among the voltage command, the PWM pulse, the voltage vector, and the neutral point potential (Vn-m, Vn-s) in this first embodiment.

As illustrated in FIG. 10, the sections where the applied voltage of the inverter main circuit 311 of system 1 is V(0, 0, 1) and V(1,0, 1) are set as a section (C) and a section (D), respectively. In this example, in the section (C) and the section (D), the neutral point potential Vn-s of the system 2 is neither zero nor the DC power supply voltage E. At this time, the voltage vectors in system 2 are zero vectors V(0,0,1) and V(1,0,1), and thus a voltage is applied to the inverter main circuit 321 in system 2. For this reason, Vn-m fluctuates under the influence of the system 2. In this case, in the system 1, the neutral point potential Vn-m is not used for estimating the rotor position.

In this way, when the neutral point potential is sensed by the own system, if the neutral point potential of the other system is either zero or the DC power supply voltage E, the neutral point potential sensed by the own system is not affected by another system. Therefore, a detection error is prevented for the neutral point potential sensed by the own system.

Figure 11:
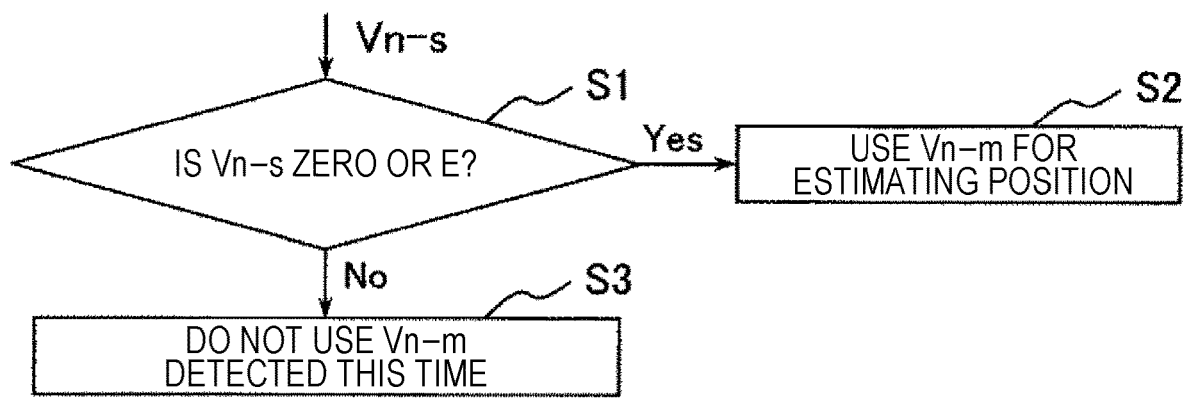
FIG. 11 is a flowchart illustrating a neutral point potential detection process of a neutral point potential detection part in the system 1.

FIG. 11 is a flowchart illustrating a neutral point potential detection process executed by the neutral point potential detection part 11 in the system 1.

In step S1, the neutral point potential detection part 11 determines whether the neutral point potential Vn-s sensed in the system 2 is zero or the DC power supply voltage E.

If it is determined that Vn-s is zero or E (Yes in step S1), step S2 is executed, and the neutral point potential detection part 11 outputs the sensed neutral point potential Vn-m of the system 1 as the neutral point voltage detection value Vn-m'. Further, this Vn-m' is used for estimating the rotor position ed-m in the rotation position estimation part 21 of the system 1.

If it is determined that Vn-s is neither zero nor E (No in step S1), step S3 is executed, and the neutral point potential detection part 11 does not output the sensed neutral point potential Vn of the sensed system 1-*m* as the neutral point voltage detection value Vn-m'. That is, the sensed neutral point potential Vn-m' of the system 1 is not used for the estimation of the rotor position ed-m. In this case, the current rotor position may be estimated and calculated from the previously estimated rotor position and rotational speed.

Incidentally, the neutral point potential detection part 12 of the system 2 also executes the neutral point potential detection process of system 1 similarly with in FIG. 11

As a modified example of this first embodiment, the control part 61 in the system 1 and the control part 62 in the system 2 have a configuration in which the phase of the triangular wave carrier for PWM is shifted by a predetermined amount, so that the neutral point potential in the own system can be detected at the timing when the other system becomes V(0,0,0) or V(1,1,1). Incidentally, preferably, the phase is shifted by 90 degrees. Accordingly, the neutral point potential in the own system can be reliably detected at the timing when the other system becomes the zero vector.

As described above, according to this first embodiment, the fluctuation of the neutral point potential in the own system due to the magnetic interference accompanying the voltage application by the inverter of the other system is prevented, so that the estimation accuracy of the rotor position is improved. For this reason, in a motor drive system in which one permanent magnet synchronous motor is driven by two inverters, a position sensorless drive at an extremely low speed is possible.

According to this first embodiment, whether or not the other system is applying a voltage is determined without communicating between the control microcomputers in the systems depending on whether the neutral point potential of the other system is 0 or the DC power supply voltage E. Thus, a configuration is made simple such that the neutral point potential of each system is input. For this reason, the increase in the cost of the control device which drives one three-phase synchronous motor with a plurality of inverters can be suppressed.

Incidentally, the control system of the system 1 and the control system of the system 2 may be configured by a single microcomputer. Accordingly, the device configuration of the control system can be simplified. In this case, the neutral point potentials of the three-phase windings 41 and 42 are taken into one microcomputer, and thus the wiring for taking in the neutral point potential becomes easy.

Second Embodiment

In the first embodiment (FIG. 4), the neutral point potential detection part of the own system (for example, system 1) takes in the neutral point potential sensed in the other system in order to determine the presence or absence of voltage application in the other system (for example, system 2). The neutral point potential of the other system is one piece of information indicating the driving state of the inverter of the other system. In this second embodiment, as such information, a gate signal is applied instead of the neutral point potential.

Hereinafter, this second embodiment will be described with reference to FIGS. 12 and 13.

Figure 12:
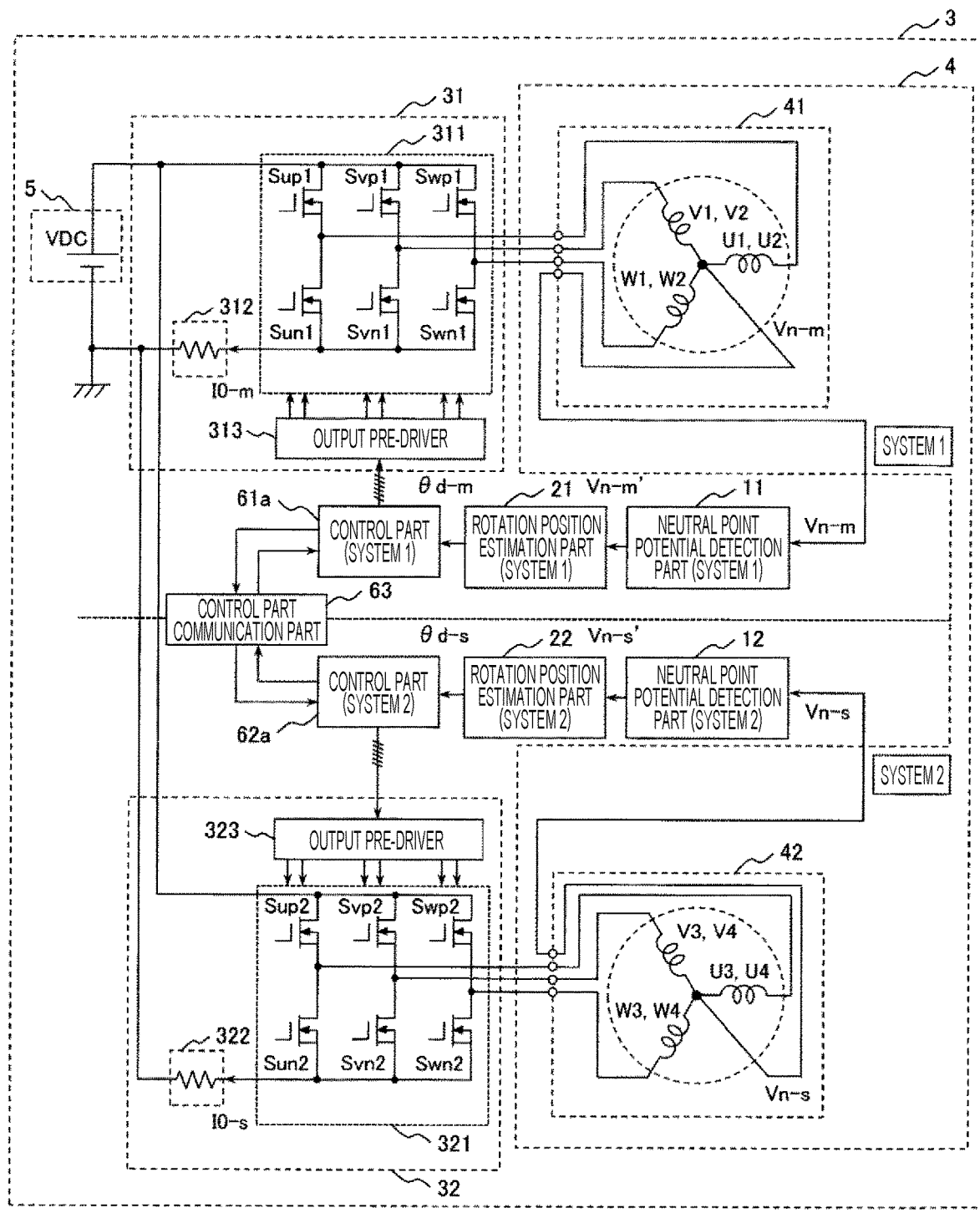
FIG. 12 is a block diagram illustrating a configuration of a motor control device according to a second embodiment.

FIG. 12 is a block diagram illustrating a configuration of a motor control device according to the second embodiment of the invention. Incidentally, differences from the first embodiment will be mainly described.

In this second embodiment, as illustrated in FIG. 12, a control part communication part 63 is provided, and a control part 61*a* of the system 1 and a control part 62*a* of the system 2 communicate with each other. Accordingly, the control part 61*a* of the system 1 can fetch the gate command signal (PWM pulse signal) output from the control part 62*a* of the system 2 to the output pre-driver 323.

On the basis of the fetched gate command signal of the system 2, the control part 61*a* determines whether or not the rotor position θd-m output from the rotation position estimation part 21 of the system 1 is estimated in the section where the applied voltage vector in the system 2 is a zero vector, that is, either V(0, 0,0) and V(1,1,1).

Incidentally, similarly with the control part 61*a* of the system 1, on the basis of the fetched gate command signal of the system 1, the control part 62*a* of the system 2 determines whether or not θd-s output from the rotation position estimation part 22 of the system 2 is estimated in the section where the applied voltage vector in the system 1 is a zero vector, that is, either V(0,0,0) and V(1,1,1).

The neutral point potential detection part (11, 12) outputs the sensed detected neutral point potential (Vn-m, Vn-s) as the neutral point potential detection value (Vn-m', Vn-s') without depending on the presence or absence of the fluctuation.

Figure 13:
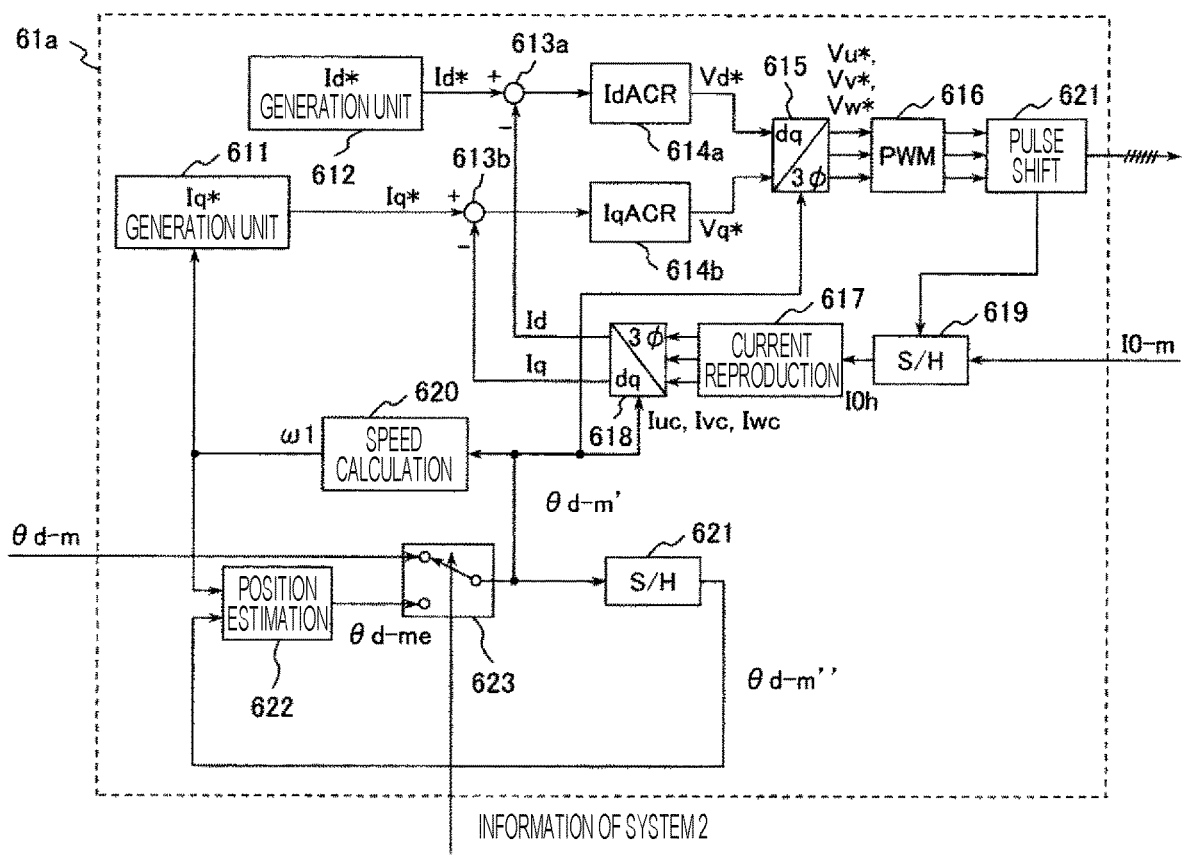
FIG. 13 is a block diagram illustrating a configuration of a control part of the system 1.

FIG. 13 is a block diagram illustrating a configuration of the control part 61*a* of the system 1. Incidentally, the configuration of the control part 62*a* of the system 2 is the same as that of the control part 61*a* of the system 1, and illustration and description thereof are omitted.

As illustrated in FIG. 13, in the control part 61*a* in this second embodiment, a sample/hold unit 621, a position estimation unit 622, and a position determination unit 623 are added to the control part 61*a* (FIG. 5) in the first embodiment.

Similarly with the sample/hold unit 619, the sample/hold unit 621 stores an input rotor position (θd-m') as a rotor position (θd-m") one control cycle ago.

The position estimation unit 622 estimates a rotor position θd-me from the rotation speed ω1 output by the speed calculation unit 620 and the rotor position θdm" one control cycle ago stored by the sample/hold unit 621.

On the basis of the information of the system 2 input via the control part communication part 63, and the gate command signal of the system 2 in this second embodiment, the position determination unit 623 selects and outputs either the θd-m output by the rotation position estimation part 21 and the θd-me output from the position estimation unit 622. That is, on the basis of the gate command signal of the system 2, the position determination unit 623 selects θd-m if it is determined that the applied voltage vector in the system 2 is a zero vector, and selects ed-me if it is determined that the applied voltage vector is not a zero vector.

Accordingly, when the neutral point potential sensed in the own system is affected by the voltage application to the other system, the previously selected Od-m, that is, the rotor position estimated by the rotation position estimation part of the own system at the time when there is no influence of the other system is used for motor control. Thus, a control accuracy can be maintained.

As a modification of this second embodiment, the control system of the system 1 and the system 2 including the control part 61*a* and the control part 62*a* may be configured by the same microcomputer, and the control part communication part 63 in FIG. 12 may be omitted.

As described above, according to this second embodiment, the fluctuation of the neutral point potential in the own system due to the voltage application by the inverter of the other system is prevented, and even when there is influence of the other system, the rotor position can be estimated without the influence. Thus, the estimation accuracy is improved. For this reason, in a motor drive system in which one permanent magnet synchronous motor is driven by two inverters, a position sensorless drive at an extremely low speed is possible.

According to this second embodiment, the signal line for taking in the neutral point potential sensed in the other system is not necessary in the neutral point potential detection part of the own system. For this reason, the configuration of the motor control device can be simplified.

Third Embodiment

A third embodiment of the invention will be described using FIGS. 14 to 16. Incidentally, differences from the first embodiment will be mainly described.

Figure 14:
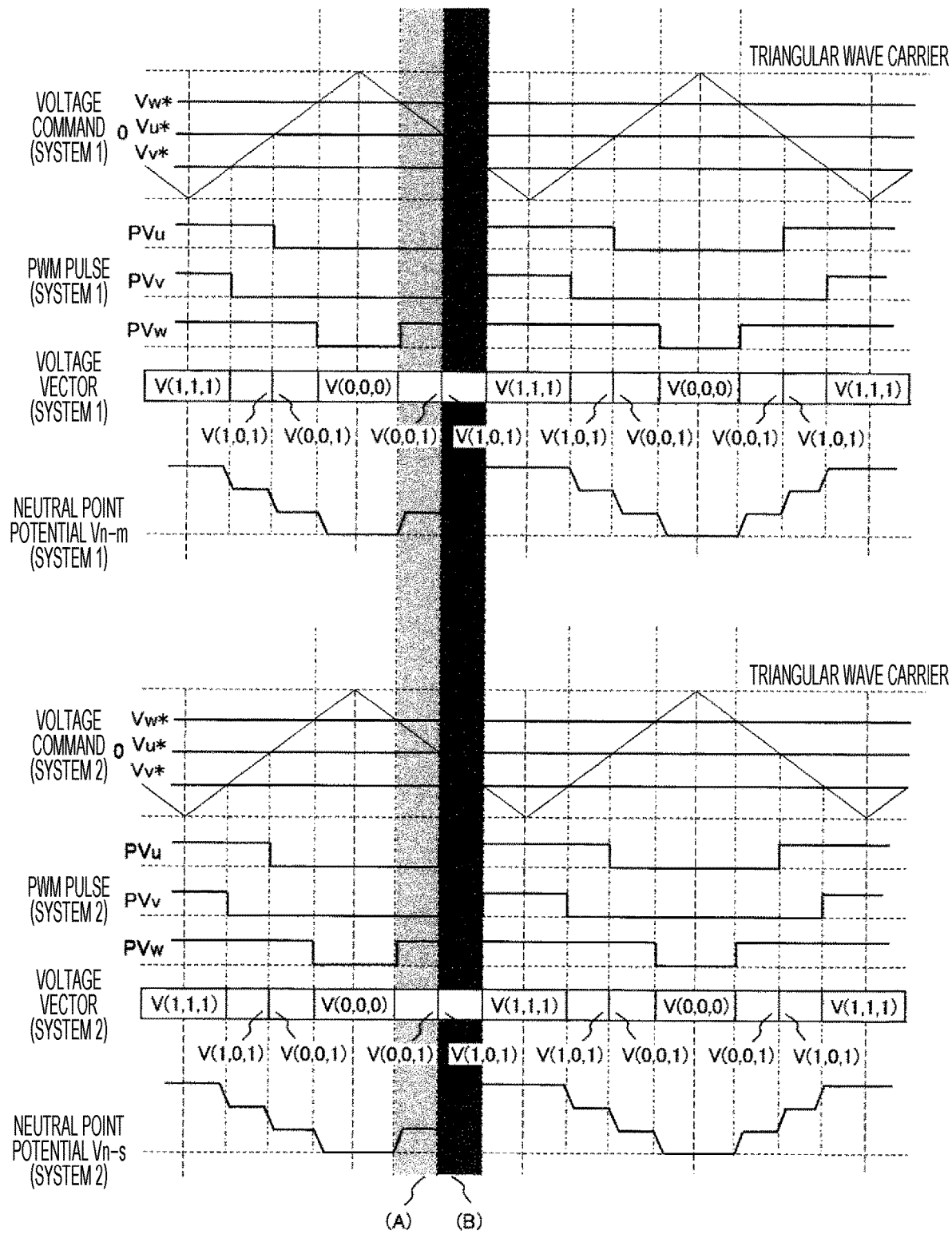
FIG. 14 illustrates an example of a relation among a voltage command, a PWM pulse, a voltage vector, and a neutral point potential in a motor control device according to a third embodiment.

FIG. 14 illustrates an example of the relation among the voltage command, the PWM pulse, the voltage vector, and the neutral point potential (Vn-m, Vn-s) in the motor control device according to the third embodiment of the present invention.

As illustrated in FIG. 14, the modulation rate is higher than in the first embodiment (FIGS. 9 and 10). Thus, each of the sections where the voltage vector is zero vectors V(0,0,0) and V(1,1,1) is shorter than that of the first embodiment (FIGS. 9 and 10). For this reason, in these zero vector sections in the other system, the probability that the neutral point potential of the own system can be detected decreases.

Therefore, in this third embodiment, the position estimation accuracy is improved by the following means even if the modulation rate is high.

Figure 15:
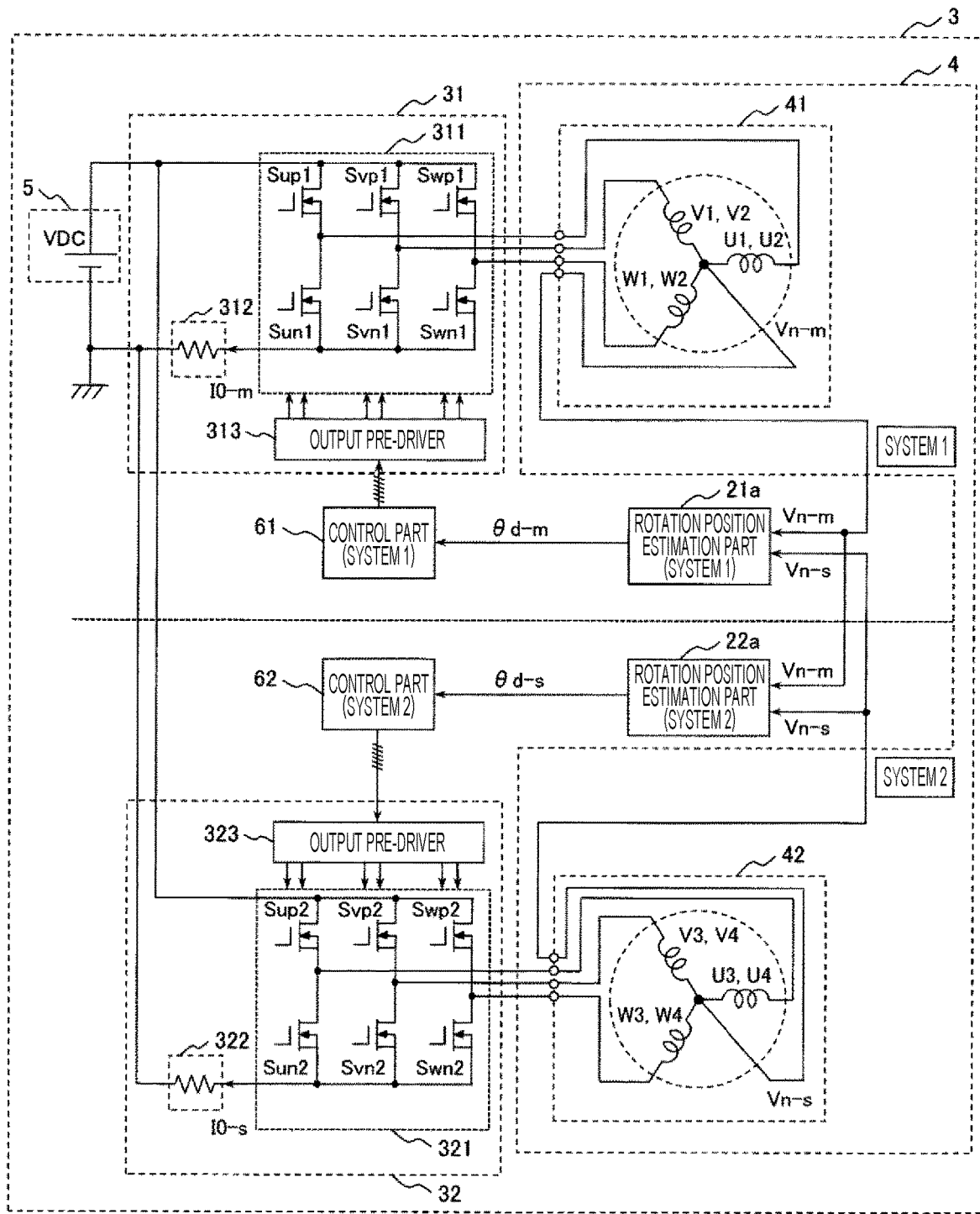
FIG. 15 is a block diagram illustrating a configuration of a motor control device according to a third embodiment.

FIG. 15 is a block diagram illustrating a configuration of a motor control device according to the third embodiment of the invention.

As illustrated in FIG. 15, in this third embodiment, the neutral point potential detection parts (11, 12) in the first embodiment (FIG. 4) are not provided, and the rotation position estimation part 21a and 22a estimates the rotor position on the basis of the neutral point potential (Vn-m, Vn-s) sensed in the own system and the other system.

Figure 16:
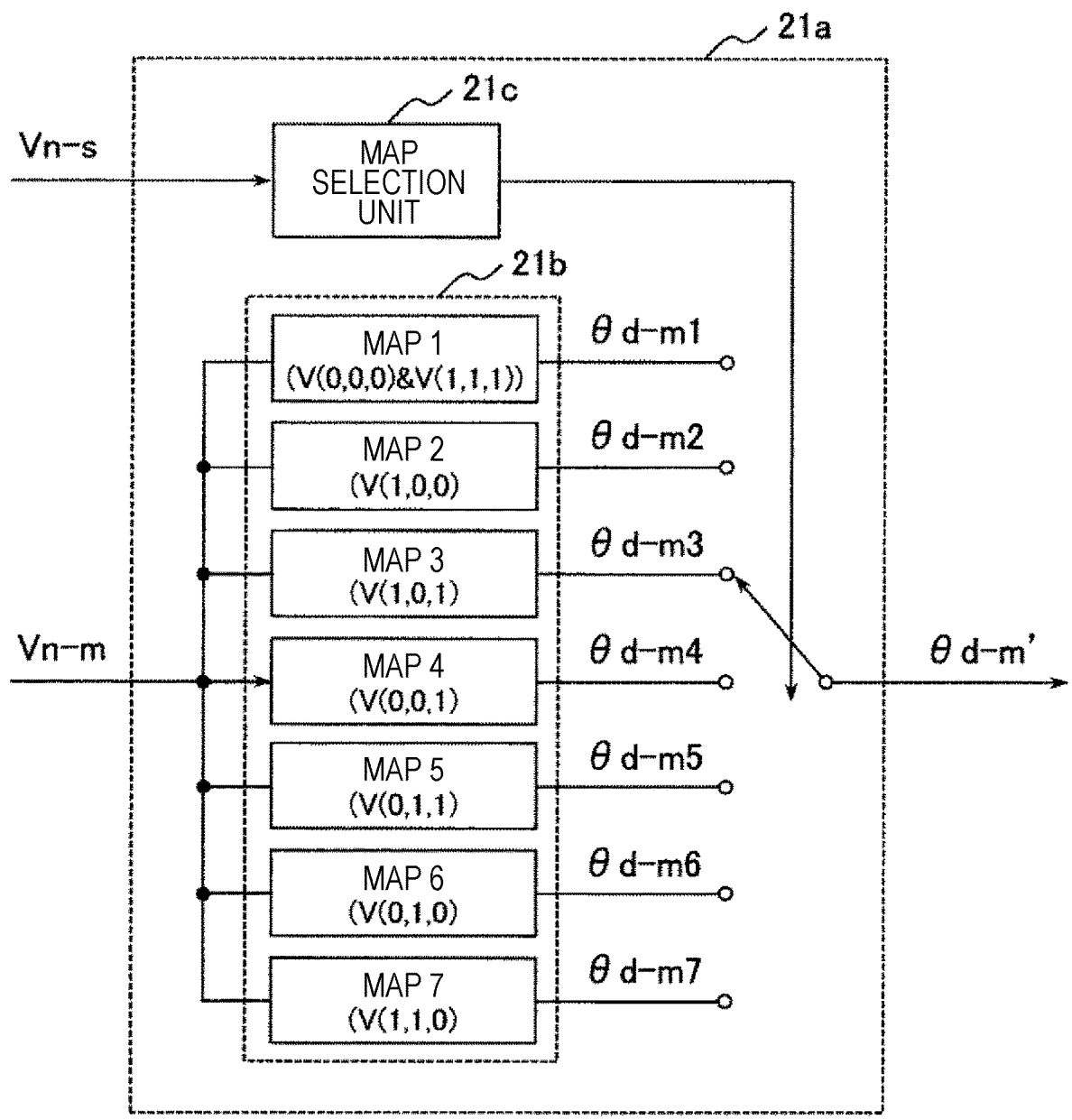
FIG. 16 is a block diagram illustrating a configuration of a rotation position estimation part of the system 1 in the third embodiment.

FIG. 16 is a block diagram illustrating a configuration of the rotation position estimation part 21a of the system 1 in this third embodiment. Incidentally, the configuration of the rotation position estimation part 22a of the system 2 is the same as that of the rotation position estimation part 21a, and thus illustration and description thereof are omitted.

As illustrated in FIG. 16, the rotation position estimation part 21a includes map data representing the relation between the neutral point potential Vn-m of the system 1 and the rotor position or a plurality of maps having table data or functions. The plurality of maps 21b are provided for each voltage vector in the system 2, and in FIG. 16, map 1, map 2, map 3, map 4, map 5, map 6, and map 7 are provided for zero vectors (V (0,0,0), V(1,1,1)), V(1,0, 0), V(1,0,1), V(0, 0,1), V(0,1,1), V(0,1,0) and V(1,1,0)), respectively. These map 1, map 2, map 3, map 4, map 5, map 6 and map 7 output rotor positions θd-m1, θd-m2, and θd-m3, θd-m4, θd-m5, θd-m6, and θd-m7 according to the input Vn-m, respectively.

Further, the rotation position estimation part 21a includes a map selection unit 21c that selects a rotor position corresponding to the voltage vector applied in the system 2 from the rotor positions θd-m1 to θd-m7 output from the maps 1 to 7 on the basis of the neutral point potential Vn-s sensed in the system 2 and outputs the rotor position as the estimated value θd-m ' of the rotor position. Incidentally, in FIG. 16, on the basis of Vn-s, the map selection unit 21c selects θd-m3 that the map 3 in which the voltage vector applied in the system 2 is V(1,0,1) outputs according to Vn-m. That is, on the basis of Vn-m and Vn-s, the rotation position estimation part 21a estimates that the rotor position θd-m is θd-m3 for the system 1.

As described above, according to this third embodiment, even when the applied voltage vector of the other system is a voltage vector other than the zero vector, the neutral point potential Vn-m of the own system can be detected to estimate the rotor position. Accordingly, the accuracy of motor control based on the estimated rotor position is improved.

Incidentally, as described in the first embodiment, instead of the map, the neutral point potential detected for two types of voltage vectors in the own system may be regarded as the three-phase AC amounts (for two phases) to use the estimation calculation equation of the rotor position using coordinate conversion (three-phase two-phase conversion) Accordingly, the memory capacity used in the control system can be saved, and the identification of the map data becomes unnecessary, so that the control system can be easily constructed.

Fourth Embodiment

In this fourth embodiment, the rotor position estimation using the neutral point potential as described above and rotation position detection using a rotation position detector (for example, a Hall IC, a resolver, an encoder, and a GMR sensor) are used in combination. Normally, a motor control is executed on the basis of the rotor position sensed by the rotation position detector. Further, an abnormality of the rotation position detector is determined on the basis of an estimated rotation position based on the neutral point potential. When it is determined that the rotation position detector is abnormal, the motor control is executed on the basis of the estimated rotation position based on the neutral point potential. Accordingly, even if a malfunction such as a failure or a signal abnormality occurs in the rotation position detector, the motor control can be continued by the estimated rotor position, so that the reliability of the motor control device is improved.

Hereinafter, the fourth embodiment will be described using FIGS. 17 and 18. Incidentally, differences from the first embodiment will be mainly described.

Figure 17:
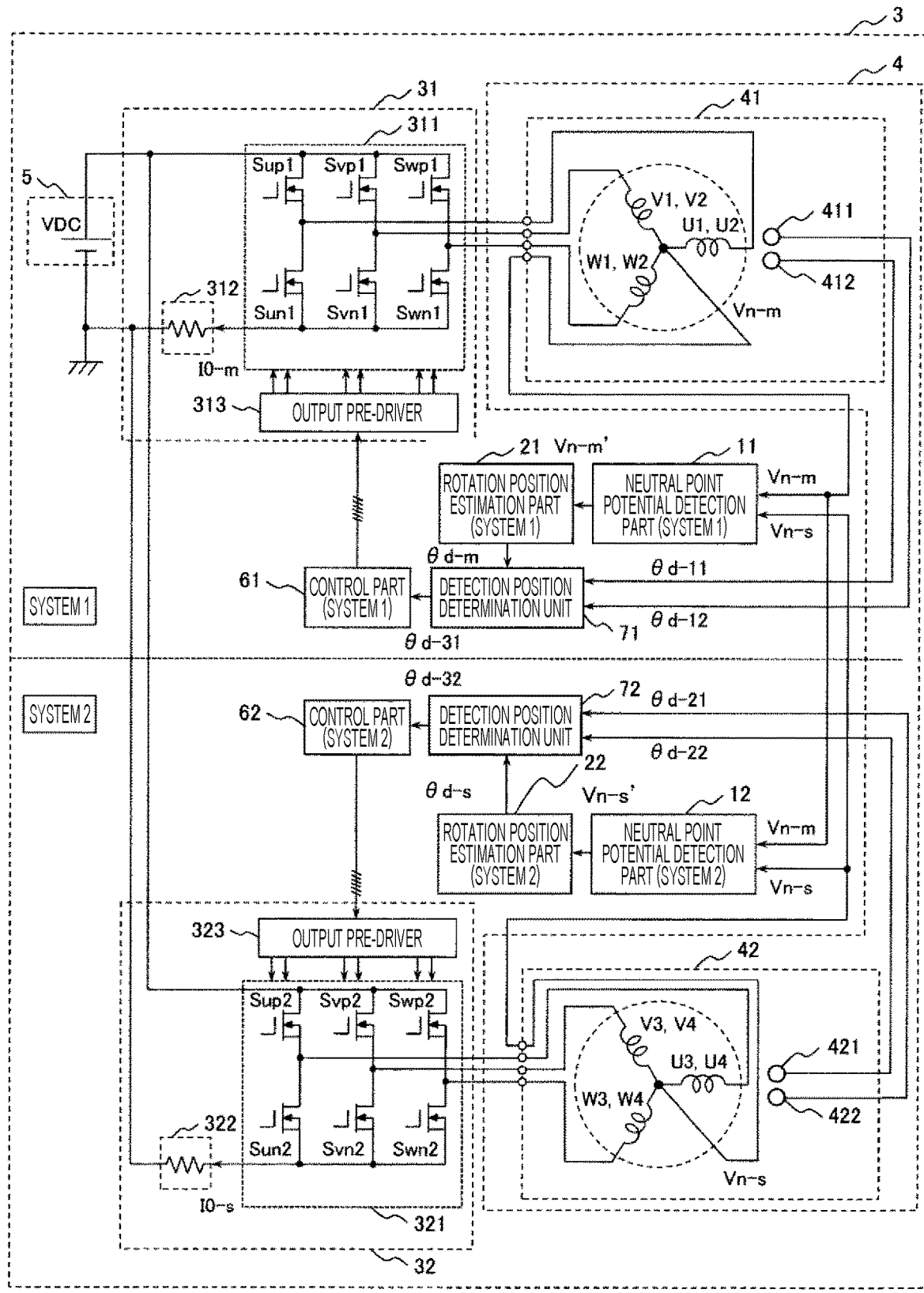
FIG. 17 is a block diagram illustrating a configuration of a motor control device according to a fourth embodiment.

FIG. 17 is a block diagram illustrating a configuration of a motor control device according to the fourth embodiment of the invention.

As illustrated in FIG. 17, in addition to the configuration of the first embodiment (FIG. 4), rotation position detectors 411 and 412 are provided in the system 1, and rotation position detectors 421 and 422 are provided in the system 2. In this fourth embodiment, the reliability of rotation position detection by the rotational detector is improved by redundantly providing a plurality of rotation position detectors in each system.

The system 1 is provided with a detection position determination unit 71 that determines a correct rotor position among rotor positions θd-11 and θd-12 sensed by the rotation position detectors 411 and 412 and the rotor position θd-m estimated by the rotation position estimation part 21 and outputs the rotor position as a rotor position θd-31 to the control part 61. In addition, the system 2 is provided with a detection position determination unit 72 that determines a correct rotor position among rotor positions θd-21 and θd-22 sensed by the rotation position detectors 421 and 422 and the rotor (estimated) position θd-s estimated by the rotation position estimation part 22 and outputs the rotor position as a rotor position θd-32 to the control part 62.

Figure 18:
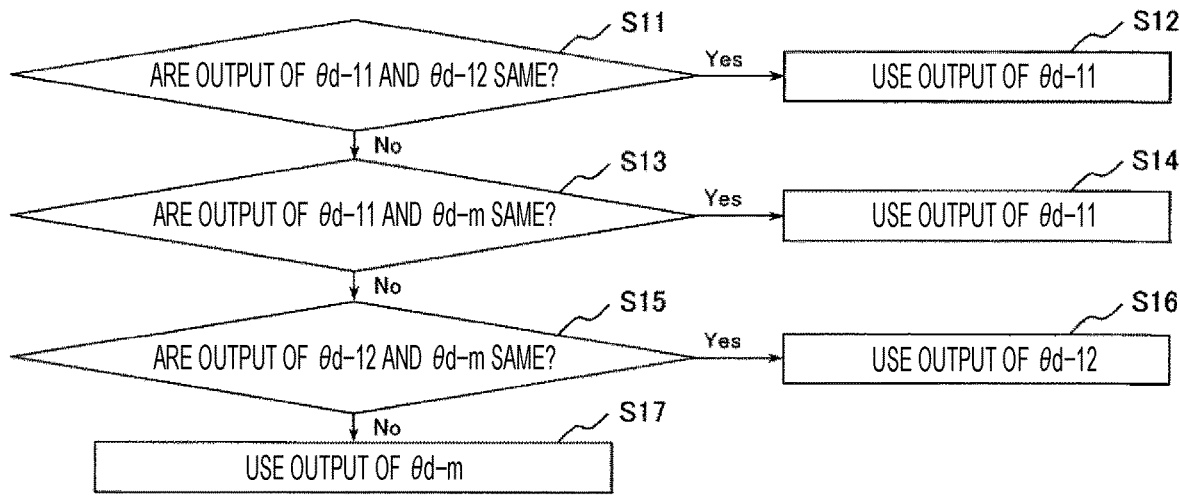
FIG. 18 is a flowchart showing a determination process of a detection position determination unit in the system 1.

FIG. 18 is a flowchart illustrating the determination process executed by the detection position determination unit 71 in the system 1. Incidentally, the same is applied to the determination process executed by the detection position determination unit 72 in the system 2.

First, in step S11, the detection position determination unit 71 determines whether θd-11 that is the output of the rotation position detector 411 and θd-12 that is the output of the rotation position detector 412 are substantially the same. For example, when the magnitude of the difference between θd-11 and θd-12 is equal to or smaller than a preset value, it is determined that θd-11 and θd-12 are substantially the same. If θd-11 and θd-12 are substantially the same (Yes in step S11), the procedure proceeds to step S12. If θd-11 and θd-12 are not substantially the same, the procedure proceeds to step S13 (No in step S11).

In step S12, the detection position determination unit 71 outputs θd-11 as the correct rotor position θd-31 to the control part 61. That is, in the control part 61, θd-11 is used for motor control. Incidentally, in this step S12, the detection position determination unit 71 may output θd-12 as θd-31 instead of θd-11.

Herein, if θd-11 and θd-12 are not substantially the same, it can be determined that either the rotation position detector 411 or the rotation position detector 412 is abnormal. In this regard, in step S13 and step S14, by using the estimated rotor position θd-m output by the rotation position estimation part 21, it is determined whether any rotation position detector of the rotation position detector 411 and the rotation position detector 412 is abnormal.

In step S13, the detection position determination unit 71 determines whether θd-11 and θdm are substantially the same. For example, when the magnitude of the difference between θd-11 and θd-m is equal to smaller than or a preset value, it is determined that θd-11 and θd-m are substantially the same. If θd-11 and θd-m are substantially the same (Yes in step S13), it is determined that the rotation position detector 411 is normal, and the procedure proceeds to step S14. If θd-11 and θd-m are not substantially the same, it is determined that the rotation position detector 411 is abnormal, and the procedure proceeds to step S15 (No in step S13).

In step S14, the detection position determination unit 71 outputs θd-11 as the correct rotor position θd-31 to the control part 61. That is, in the control part 61, θd-11 is used for motor control.

In step S15, the detection position determination unit 71 determines whether θd-12 and θd-m are substantially the same. For example, when the magnitude of the difference between θd-12 and θd-m is equal to or smaller than a preset value, it is determined that θd-12 and θd-m are substantially the same. If θd-12 and θd-m are substantially the same (Yes in step S15), it is determined that the rotation position detector 412 is normal, and the procedure proceeds to step S16. If θd-12 and θd-m are not substantially the same, it is determined that the rotation position detector 412 is abnormal (No in step S15), and the procedure proceeds to step S17.

In step S16, the detection position determination unit 71 outputs θd-12 as the correct rotor position θd-31 to the control part 61. That is, in the control part 61, θd-12 is used for motor control.

In step S17, since it is determined in steps S13 and S14 that both the rotation position detectors 411 and 412 are abnormal, the detection position determination unit 71 outputs θd-m as the correct rotor position θd-31 to the control part 61. That is, in the control part 61, θd-m is used for motor control.

Incidentally, the positions of θd-11, θd-12, and θd-m are preferably positions at the same timing. For example, the three positions can be compared at the same timing by correcting the detection timing of the rotation position detector or correcting each position data by interpolation or the like. Accordingly, the determination accuracy of the abnormality of the rotation position detector is improved.

As described above, according to this fourth embodiment, it is possible to determine which rotation position detector is abnormal among the plurality of redundantly provided rotation position detectors on the basis of the estimated rotation position. Accordingly, even if any of the plurality of rotation position detectors is abnormal, a normal rotation position detector is selected, and motor control is executed in the same way as in a normal time (when there is no failure). Thus, the desired motor torque can be continuously output. Further, even if the plurality of rotation position detectors are all abnormal, the motor control can be executed using the estimated rotor position, so that the motor drive can be maintained.

Incidentally, the rotation position estimation means in this fourth embodiment is one function of a microcomputer configuring the control system and can be realized without adding hardware such as a rotation position detector. Therefore, according to this fourth embodiment, the reliability of the motor control device can be improved without increasing the cost of the motor control device.

Fifth Embodiment

Figure 19:
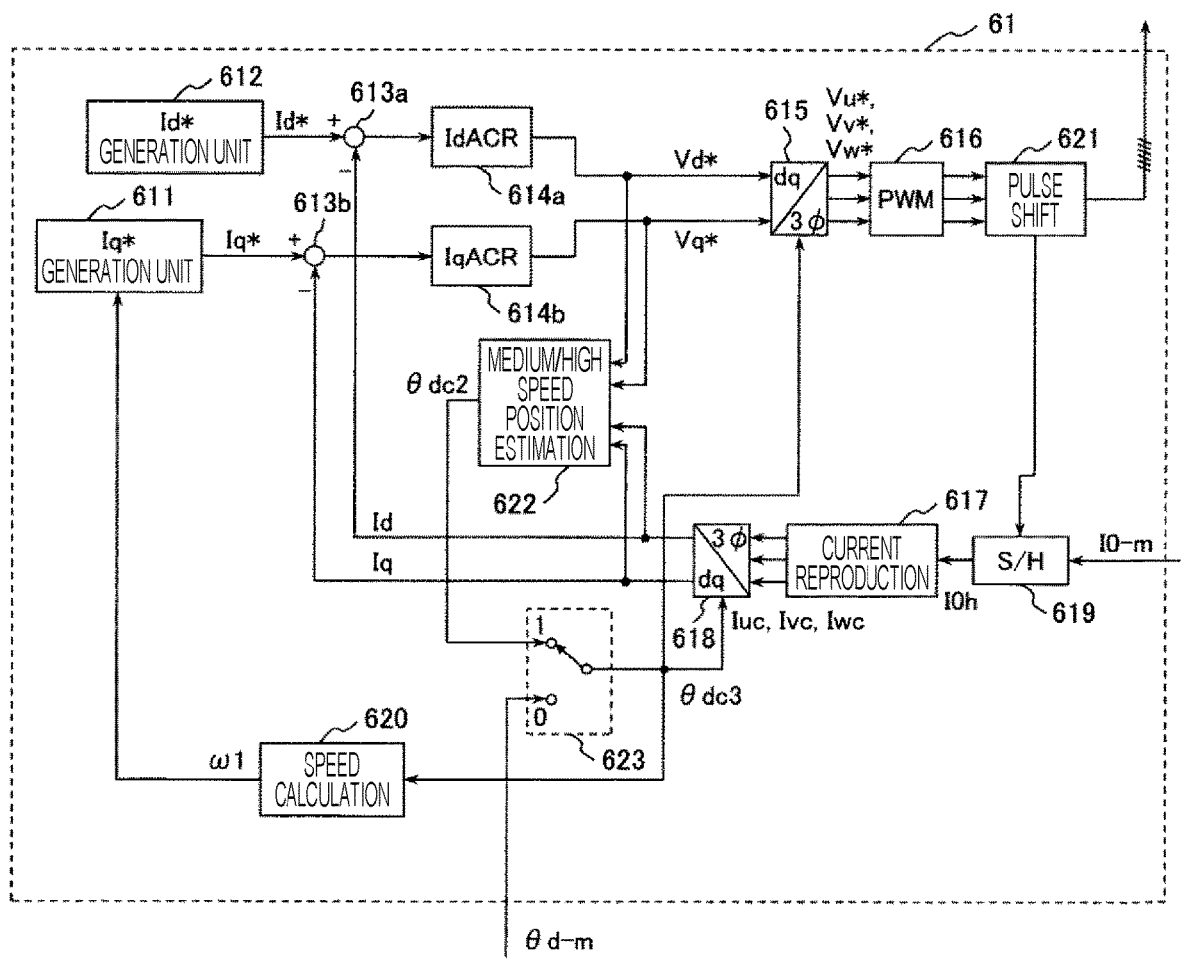
FIG. 19 is a block diagram illustrating a configuration of a control part of the system 1 in a motor control device according to a fifth embodiment.

FIG. 19 is a block diagram illustrating a configuration of the control part 61 of the system 1 in a motor control device according to a fifth embodiment of the invention. Incidentally, the control part of system 2 also has the same configuration. In addition, the configuration other than the control part is the same as that of the fourth embodiment (FIG. 17). For this reason, the illustration and description of the control part 62 of the system 2 are omitted. Hereinafter, differences from the fourth embodiment (FIG. 17) will be mainly described.

As illustrated in FIG. 19, in this fifth embodiment, the control part 61 includes a medium/high speed position estimator 622 and an estimated phase changeover switch 623 in addition to the configuration of the control part 61 of the first embodiment (FIG. 5).

The medium/high speed position estimator 622 calculates and estimates the rotor position θdc2 from the constants (inductance and winding resistance) of the permanent magnet synchronous motor 4 on the basis of the dq-axis voltage commands Vd* and Vq* and the dq-axis current detection values Id and Iq. This is a known rotor position estimation means based on the induced voltage, and the description of a specific calculation method is omitted. Incidentally, various means are known as the rotor position estimation means based on the induced voltage, and the detailed description is omitted, but any means may be applied.

The estimated phase changeover switch 623 selects θdc2 output from the medium/high speed position estimator 622 and θd-m estimated on the basis of the neutral point potential by the rotation position estimation part 21 according to the motor speed (rotational speed), and outputs θdc2 and θd-m as the rotor position θdc3 used for control. That is, the rotor position estimation algorithm is changed according to the motor speed. For example, if a speed equal to or higher than a predetermined value is set to medium high speed, and a speed smaller than the predetermined value is set to low speed, the estimated phase changeover switch 623 selects θdc2 at the medium high speed and θd-m at the low speed. Incidentally, in this fourth embodiment, the motor speed ω1 is calculated on the basis of θdc3 by the speed calculation unit 620.

Incidentally, instead of switching between θdc2 and θd-m, weighting may be applied to θd-m and θdc2 such that θd-m is dominant in the low speed range, and θdc2 is dominant in the medium and high speed range, thereby calculating the rotor position θdc3. In this case, the control based on the neutral point potential and the control based on the induced voltage are gradually switched, and thus the stability of the control is improved at the time of switching between the low speed range and the high speed range. Further, the rotational speed of switching between θd-m and θdc2 may be provided with hysteresis. Accordingly, hunting at the time of switching can be prevented.

In this fifth embodiment, θdc2 and θd-m are switched according to the motor speed calculated by the speed calculation unit 620. However, the invention is not limited thereto. θdc2 and θd-m may be switched according to the motor speed detected by a rotation position sensor (magnetic pole position sensor, steering angle sensor, and the like).

As described above, according to this fifth embodiment, the accuracy of the rotor position used for motor control is improved in a wide speed range from the low speed range to the medium and high speed range, and thus the accuracy, stability, and reliability of the speed control of the synchronous motor are improved.

Incidentally, the medium/high speed position estimator 622 and the estimated phase changeover switch 623 in FIG. 19 are not limited to the fourth embodiment and may be applied to the first to third embodiments.

Sixth Embodiment

Figure 20:
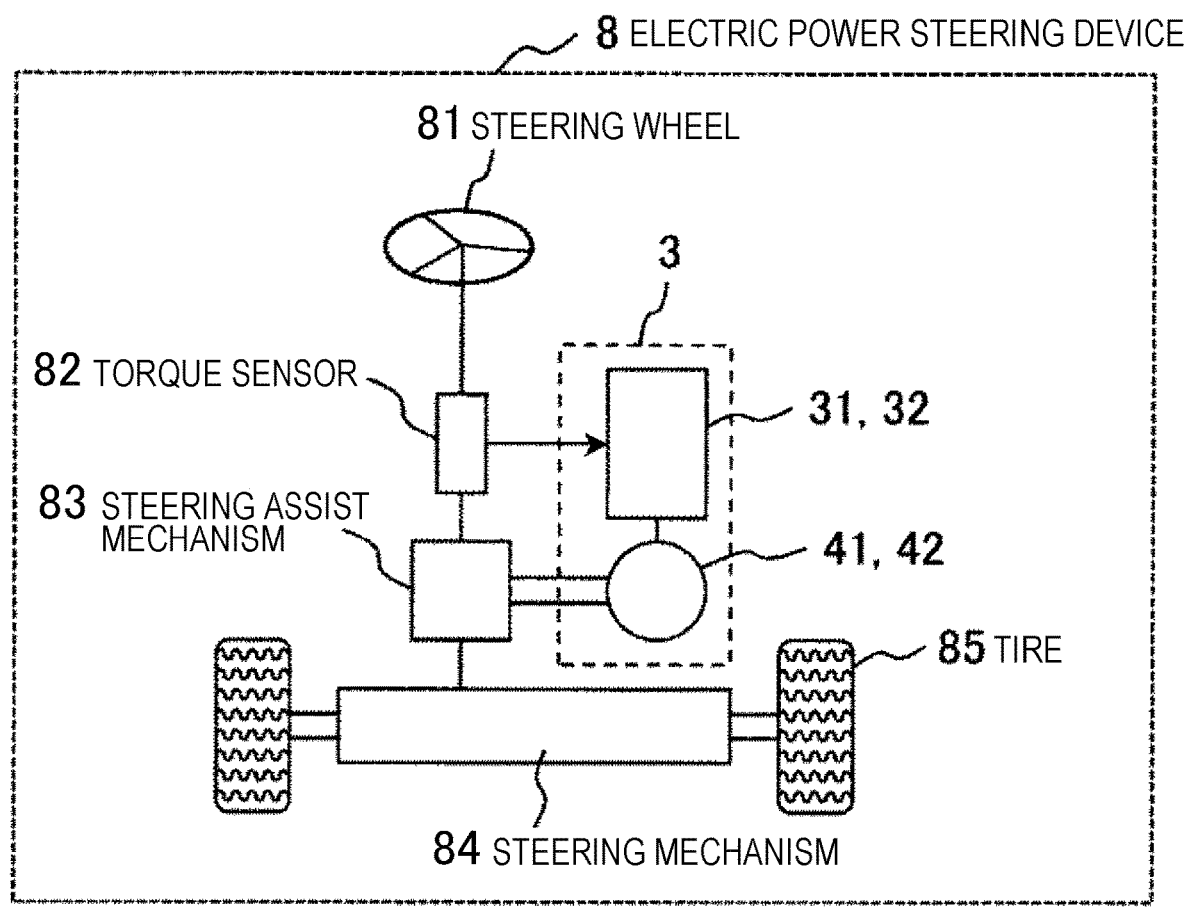
FIG. 20 illustrates a configuration of an electric power steering device according to a sixth embodiment.

FIG. 20 illustrates a configuration of an electric power steering device according to a sixth embodiment of the invention.

As illustrated in FIG. 20, in the electric power steering device 8, the rotation torque of the steering wheel 81 is detected by the torque sensor 82, and the inverters 31 (system 1) and 32 (system 2) in the motor control device 3 drives and controls the permanent magnet synchronous motor (three-phase winding 41 (system 1), three-phase winding 42 (system 2)) according to the detected rotation torque. As a result, the motor torque generated by the permanent magnet synchronous motor is transmitted to the steering mechanism 84 via the steering assist mechanism 83. Accordingly, when the steering wheel 81 is operated by the driver, the tire 85 is steered by the steering mechanism 84 while the electric power steering device 8 assists the steering force according to the operation input to the steering wheel 81.

As the motor control device 3 according to this sixth embodiment, the motor control device according to the fifth embodiment (FIG. 19) is applied (see the fourth embodiment (FIG. 17) for the overall configuration). Accordingly, one permanent magnet synchronous motor is driven by the two inverters 31 and 32. The inverters 31 and 32 are controlled on the basis of the rotor position sensed by a plurality of redundantly provided rotation position detectors and the rotor position estimated on the basis of the neutral point potential.

Incidentally, as in the fifth embodiment, θdc2 output from the medium/high speed position estimator 622 and θd-m estimated on the basis of the neutral point potential by the rotation position estimation part 21 are switched according to the rotational speed of the motor. In this sixth embodiment, the motor rotation speed is measured using a steering angle sensor (not illustrated) that measures the angular position of the steering wheel 81 and detects the steering angle of the vehicle. For example, the rotational speed is calculated from the time change of the steering angle.

According to this sixth embodiment, as in the fourth embodiment, it is possible to determine which rotation position detector is failed among the plurality of rotation position detectors on the basis of the estimated rotation position. Thus, even if any of the plurality of rotation position detectors is failed, a normal rotation position detector is selected, and motor control is executed in the same way as in a normal time (when there is no failure) to continue outputting the desired motor torque. For this reason, the electric power steering device can continue the assist operation normally.

Even if the plurality of rotation position detectors fail together, the motor control can be continued using the estimated rotation position, and thus the electric power steering device can continue the assist operation. For example, even when a vehicle tire rides on a step, the electric power steering device can continuously assist the steering force.

When the plurality of rotation position detectors fail together, motor control can be continued using the estimated rotation position. Accordingly, while the driver is notified of the failure, the output of the permanent magnet motor can be reduced gradually, and it can prevent falling into an assist stop suddenly. Accordingly, when the plurality of rotation position detectors provided in the electric power steering device fail or have abnormality together, the driver can safely stop the vehicle.

The rotation position estimation means can be realized without adding hardware. For this reason, according to this sixth embodiment, the reliability of the electric power steering device can be improved without increasing the cost.

Incidentally, as the motor control device 3 in this sixth embodiment, the first to fourth embodiments may be applied as well as the fifth embodiment.

Incidentally, this invention is not limited to the above-described embodiments, and various modifications are included. For example, the above-described embodiments have been described in detail for easy understanding of the invention and are not necessarily limited to those having all the described configurations. Further, it is possible to add, delete, and replace other configurations for a part of the configuration of each embodiment.

For example, the number of inverters that drive one permanent magnet synchronous motor is not limited to two, and any number of inverters may be used. In addition, the three-phase synchronous motor is not limited to a permanent magnet synchronous motor but may be a wound field synchronous motor. In addition, the detected value of the output voltage of the inverter or a motor terminal voltage may be used as information which indicates the driving state of the inverter of the other system used for estimation of the rotor position of the own system.

REFERENCE SIGNS LIST 3 motor control device
4 permanent magnet synchronous motor
5 DC power supply
8 electric power steering device
11, 12 neutral point potential detection part
21, 21a rotation position estimation part
21b map
21c map selection unit
22, 22a rotation position estimation part
31, 32 inverter
41, 42 three-phase winding
61, 61a control part
62, 62a control part
71, 72 detection position determination unit
81 steering wheel
82 torque sensor
83 steering assist mechanism
84 steering mechanism
85 tire
311 inverter main circuit
312 one-shunt current detector
313 output pre-driver
321 inverter main circuit
322 one-shunt current detector
323 output pre-driver
411, 412, 421, 422 rotation position detector
611 q-axis current command generation unit
612 d-axis current command generation unit
613a subtraction unit
613b subtraction unit 614a d-axis current control unit
614b q-axis current control unit
615 dq inverse conversion unit
616 PWM generation unit
617 current reproduction unit
618 dq conversion unit
619 sample/hold unit
620 speed calculation unit
621 pulse shift unit

The invention claimed is:

1. A control device for a three-phase synchronous motor comprising:
 a three-phase synchronous motor including a first three-phase winding and a second three-phase winding;
 a first inverter connected to the first three-phase winding;
 a second inverter connected to the second three-phase winding;
 a first control device that controls the first inverter based on a rotor position of the three-phase synchronous motor; and
 a second control device that controls the second inverter based on the rotor position, wherein
  the first control device estimates the rotor position based on a neutral point potential of the first three-phase winding caused by a change of an inductance of the first three-phase winding due to a permanent magnet magnetic flux distribution of the rotor and a neutral point potential of the second three-phase winding caused by the change of an inductance of the second three-phase winding due to the permanent magnet magnetic flux distribution of the rotor,
  the first control device includes
   a plurality of maps representing a relation between the neutral point potential of the first three-phase winding and the rotor position in accordance with a plurality of voltage application states of the second three-phase winding, and
   a map selection unit that selects one map of the plurality of maps based on the neutral point potential of the second three-phase winding, and
   the first control device controls the first inverter based on the rotor position output from the selected map.

2. The control device for the three-phase synchronous motor according to claim 1, wherein
 the second control device estimates the rotor position based on a neutral point potential of the first three-phase winding and a neutral point potential of the second three-phase winding.

3. The control device for the three-phase synchronous motor according to claim 1, wherein
 a PWM carrier phase of the first control device and a PWM carrier phase of the second control device are shifted by a predetermined amount.

4. The control device for the three-phase synchronous motor according to claim 3, wherein
 the predetermined amount is 90 degrees.

5. The control device for the three-phase synchronous motor according to claim 1, wherein
 the first control device and the second control device are configured by a single microcomputer, and the neutral point potential of the first three-phase winding and the neutral point potential of the second three-phase winding are incorporated into the microcomputer.

6. The control device for the three-phase synchronous motor according to claim 1, wherein
 when a rotational speed of the three-phase synchronous motor is smaller than a predetermined value, the first control device estimates the rotor position based on the neutral point potential of the first three-phase winding and the neutral point potential of the second three-phase winding.

7. The control device for the three-phase synchronous motor according to claim 6, wherein
 when the rotational speed of the three-phase synchronous motor is equal to or greater than the predetermined value, the first control device estimates the rotor position based on an induced voltage and a current of the first three-phase winding.

8. The control device for the three-phase synchronous motor according to claim 7, wherein
 the predetermined value is different in magnitude during acceleration and deceleration.

9. An electric power steering device comprising:
 a steering wheel;
 a steering mechanism that steers a tire according to an operation of the steering wheel;
 a motor control device that generates a motor torque according to a rotation torque of the steering wheel; and
 a steering assist mechanism that transmits the motor torque to the steering mechanism, wherein
 the motor control device is the control device for the three-phase synchronous motor according to claim 1.

10. A control device for a three-phase synchronous motor comprising:
 a three-phase synchronous motor including a first three-phase winding and a second three-phase winding;
 a first inverter connected to the first three-phase winding;
 a second inverter connected to the second three-phase winding;
 a first control device that controls the first inverter based on a rotor position of the three-phase synchronous motor; and
 a second control device that controls the second inverter based on the rotor position of the three-phase synchronous motor, wherein
  the first control device estimates the rotor position based on a neutral point potential of the first three-phase winding and a neutral point potential of the second three-phase winding, and
  the first control device detects the neutral point potential of the first three phase winding when no voltage is applied to the second three-phase winding based on the neutral point potential of the second three-phase winding and estimates the rotor position based on the detected neutral point potential of the first three-phase winding.

11. A control device for a three-phase synchronous motor comprising:
 a three-phase synchronous motor including a first three-phase winding and a second three-phase winding;
 a first inverter connected to the first three-phase winding;
 a second inverter connected to the second three-phase winding;
 a first control device that controls the first inverter based on a rotor position of the three-phase synchronous motor; and
 a second control device that controls the second inverter based on the rotor position, wherein
  the first control device acquires information on a driving state of the second inverter, and estimates the rotor position based on a neutral point potential of the first three-phase winding caused by a change of an inductance of the first three-phase winding due to a permanent magnet magnetic flux distribution of the rotor and the information, and the information is a gate signal in the second inverter.

12. The control device for the three-phase synchronous motor according to claim 11, wherein the information is a voltage application state to the second three-phase winding by the second inverter.

13. The control device for the three-phase synchronous motor according to claim 12, wherein the first control device detects the neutral point potential of the first three-phase winding when no voltage is applied to the second three-phase winding based on the information and estimates the rotor position based on the detected neutral point potential of the first three-phase winding.

14. The control device for the three-phase synchronous motor according to claim 13, wherein the first control device holds the rotor position estimated when no voltage is applied to the second three-phase winding and controls the first inverter based on the held rotor position when a voltage is applied to the second three-phase winding.

15. The control device for the three-phase synchronous motor according to claim 11, wherein the first control device acquires the information by communicating with the second control device.

16. The control device for the three-phase synchronous motor according to claim 11, wherein the information is a neutral point potential of the second three-phase winding.

17. The control device for the three-phase synchronous motor according to claim 11, wherein when a rotational speed of the three-phase synchronous motor is smaller than a predetermined value, the first control device estimates the rotor position based on the neutral point potential of the first three-phase winding and the information.

18. The control device for the three-phase synchronous motor according to claim 17, wherein
when the rotational speed of the three-phase synchronous motor is equal to or greater than the predetermined value, the first control device estimates the rotor position based on an induced voltage and a current of the first three-phase winding.

19. A control device for a three-phase synchronous motor comprising:
    a three-phase synchronous motor including a first three-phase winding and a second three-phase winding;
    a first inverter connected to the first three-phase winding;
    a second inverter connected to the second three-phase winding;
    a first control device that controls the first inverter based on a rotor position of the three-phase synchronous motor; and
    a second control device that controls the second inverter based on the rotor position of the three-phase synchronous motor, wherein
    the first control device controls the first inverter based on the rotor position sensed by a plurality of redundantly provided rotation position detectors, and
    the first control device determines abnormality of the plurality of rotation position detectors based on an estimated rotor position estimated from a neutral point potential of the first three-phase winding and a neutral point potential of the second three-phase winding.

20. The control device for the three-phase synchronous motor according to claim 19, wherein
    when it is determined that any of the plurality of rotation position detectors is abnormal, the first control device controls the first inverter based on the estimated rotor position.

21. An electric power steering device comprising:
    a steering wheel;
    a steering mechanism that steers a tire according to an operation of the steering wheel;
    a motor control device that generates a motor torque according to a rotation torque of the steering wheel; and
    a steering assist mechanism that transmits the motor torque to the steering mechanism, wherein
    the motor control device is the control device for the three-phase synchronous motor according to claim 19,
    the first control device estimates the estimated rotor position based on a neutral point potential of the first three-phase winding and a neutral point potential of the second three-phase winding when a rotational speed of the three-phase synchronous motor is smaller than a predetermined value, and
    the rotational speed is measured using a steering angle sensor.

* * * * *